US008359530B2

(12) United States Patent
Sawai et al.

(10) Patent No.: US 8,359,530 B2
(45) Date of Patent: Jan. 22, 2013

(54) WIRELESS COMMUNICATION APPARATUS, WIRELESS COMMUNICATION METHOD, AND COMPUTER PROGRAM

(75) Inventors: Ryo Sawai, Tokyo (JP); Shinichi Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 12/565,209

(22) Filed: Sep. 23, 2009

(65) Prior Publication Data
US 2010/0107042 A1 Apr. 29, 2010

(30) Foreign Application Priority Data
Oct. 28, 2008 (JP) ................................ 2008-276290

(51) Int. Cl.
G06F 7/02 (2006.01)
H03M 13/00 (2006.01)
(52) U.S. Cl. ....................... 714/820; 714/776
(58) Field of Classification Search .................. None
See application file for complete search history.

(56) References Cited

U.S. PATENT DOCUMENTS

| 7,079,508 | B2* | 7/2006 | Ayyagari et al. | 370/329 |
|---|---|---|---|---|
| 8,081,687 | B2* | 12/2011 | Bagchi et al. | 375/260 |
| 2004/0004975 | A1* | 1/2004 | Shin et al. | 370/471 |
| 2004/0032825 | A1* | 2/2004 | Halford et al. | 370/208 |
| 2005/0013263 | A1* | 1/2005 | Kim et al. | 370/320 |
| 2005/0152317 | A1* | 7/2005 | Awater et al. | 370/338 |
| 2005/0152359 | A1* | 7/2005 | Giesberts et al. | 370/389 |
| 2005/0201337 | A1* | 9/2005 | Heo et al. | 370/335 |
| 2006/0009200 | A1* | 1/2006 | Jung et al. | 455/414.1 |
| 2006/0013293 | A1 | 1/2006 | Hirsch | |

(Continued)

FOREIGN PATENT DOCUMENTS

| JP | 6-77954 | 3/1994 |
|---|---|---|
| JP | 2006-502679 | 1/2006 |
| JP | 2006-211726 | 8/2006 |
| JP | 2008-10904 | 1/2008 |

OTHER PUBLICATIONS

Jongmin Cho; Huynh Trong Anh; Jinsang Kim; Won-Kyung Cho; May 26-28, 2008, "Architecture of Timing Synchronization for MIMO-OFDM WLAN Systems," Circuits and Systems for Communications, 2008. ICCSC 2008. 4th IEEE International Conference on , vol. No. pp. 210-214.*

(Continued)

Primary Examiner — Ajay Bhatia
Assistant Examiner — Daniel McMahon
(74) Attorney, Agent, or Firm — Oblon, Spivak, McClelland, Maier & Neustadt, L.L.P.

(57) ABSTRACT

A wireless communication apparatus that includes a first format detecting unit detecting a format by executing signal processing on a preamble of a received packet before decoding, an estimating unit using the preamble to carry out multiple types of estimations, and a decoding unit decoding the received packet in accordance with the detected format based on the estimations. The apparatus further includes a second format detecting unit detecting the format of the received packet based on decoded control information in the preamble of the received packet, an error detection determination unit, when the format detected by the first format detecting unit differs from the format detected by the second format detecting unit, determining that the format detected by the first format detecting unit is an error, and a control unit controlling operations of the estimating unit and the decoding unit based on a determined result.

15 Claims, 18 Drawing Sheets

U.S. PATENT DOCUMENTS

| | | | |
|---|---|---|---|
| 2007/0002878 A1* | 1/2007 | Moorti et al. | 370/401 |
| 2007/0089037 A1* | 4/2007 | Jiang | 714/776 |
| 2007/0230403 A1* | 10/2007 | Douglas et al. | 370/334 |
| 2007/0253499 A1* | 11/2007 | Waters et al. | 375/260 |
| 2009/0092154 A1* | 4/2009 | Malik et al. | 370/480 |
| 2009/0247091 A1* | 10/2009 | Jalloul et al. | 455/70 |
| 2010/0054368 A1* | 3/2010 | Feng | 375/340 |

OTHER PUBLICATIONS

Japanese Office Action issued Oct. 26, 2010, in Patent Application No. 2008-276290.

* cited by examiner

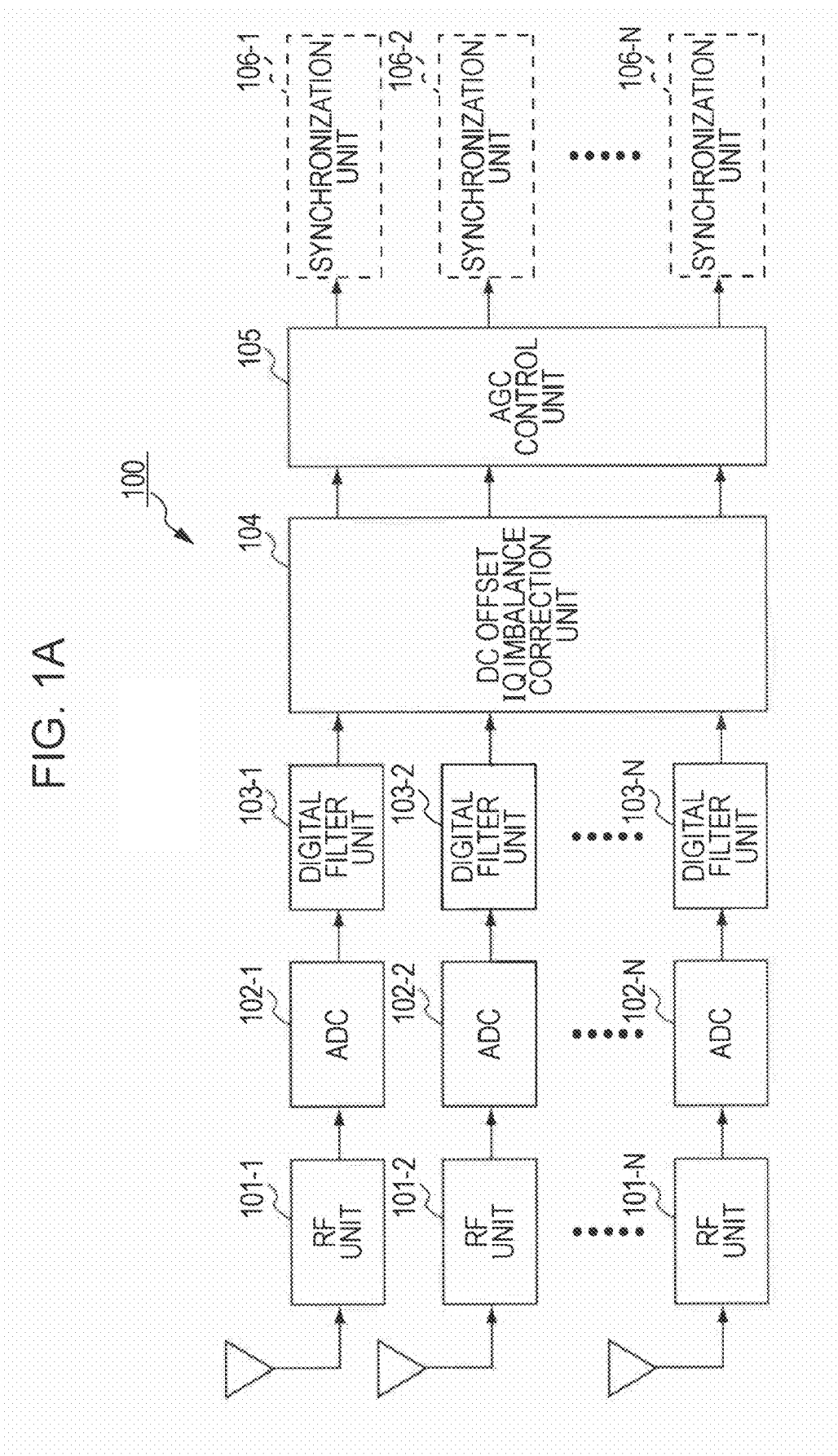

FIG. 5

| RATE (4 BITS) | | | | R | | | | | LENGTH (12 BITS) | | | | | | | F | "0" | "0" | "0" | TAIL (6 BITS) | | |
|---|---|---|---|---|---|---|---|---|---|---|---|---|---|---|---|---|---|---|---|---|---|---|
| R0 | R1 | R2 | R3 | | | | | | | | | | | | | | | | | | | |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

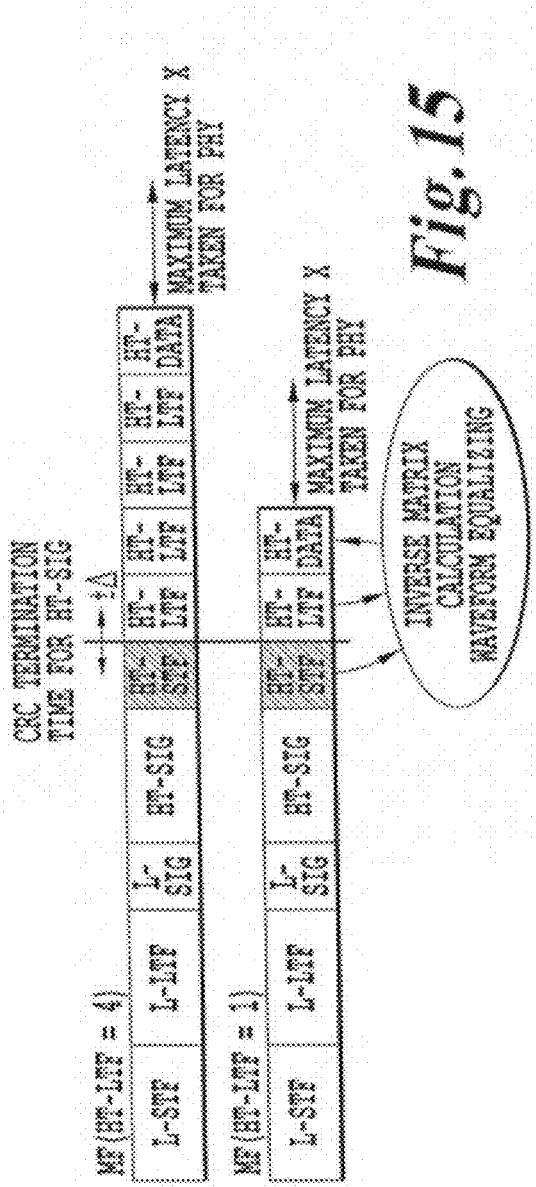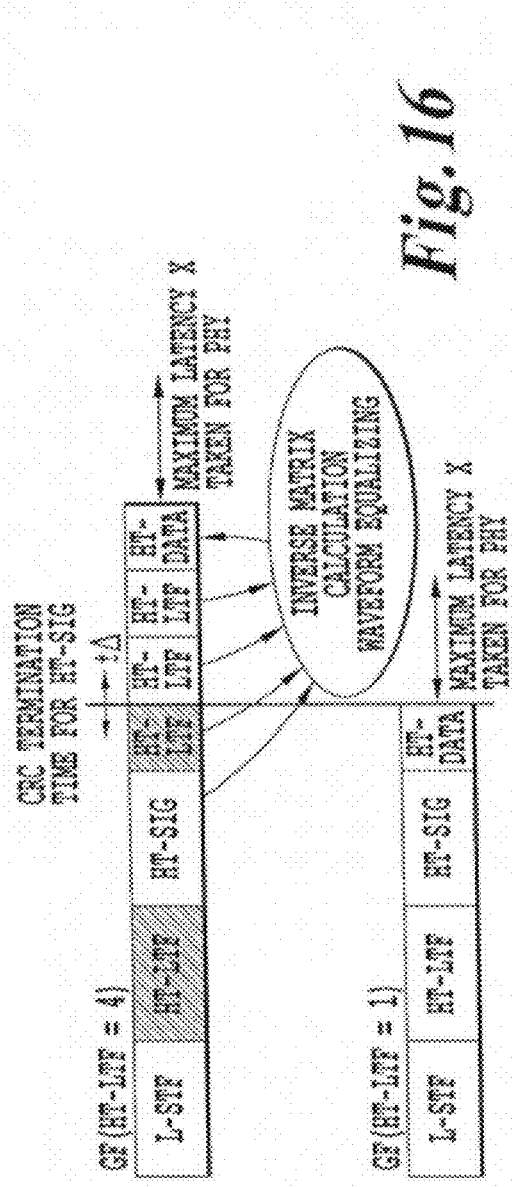

WIRELESS COMMUNICATION APPARATUS, WIRELESS COMMUNICATION METHOD, AND COMPUTER PROGRAM

BACKGROUND OF THE INVENTION

1. Field of the Invention

The invention relates to a wireless communication apparatus, wireless communication method and computer program that receives a packet in conformity with a predetermined standard format and, more particularly, to a wireless communication apparatus, wireless communication method and computer program that identify and decode the format of a received packet in a network environment in which a plurality of different packet formats are mixedly present.

2. Description of the Related Art

A wireless network becomes a focus of attention as a system for freeing from wires in an existing wired communication scheme. Standards related to the wireless network may include IEEE (The Institute of Electrical and Electronics Engineers) 802.11 and IEEE802.15. For example, IEEE802.11a/g uses an OFDM (Orthogonal Frequency Division Multiplexing) modulation scheme, which is one of multi-carrier schemes, as standards for wireless LAN.

In addition, the standards of IEEE802.11a/g support a modulation scheme that achieves a communication speed of 54 Mbps at the maximum; however, a next-generation wireless LAN standards that can implement further high bit rate is sought. For example, IEEE802.11n that employs an OFDM_MIMO communication scheme is defined as extended standards of IEEE802.11. Here, MIMO (Multiple Input Multiple Output) is such that a plurality of antenna elements are provided for both transmitter side and receiver side and a communication scheme that implements spatially multiplexed stream is employed. A transmission branch side spatially and temporally codes a plurality of pieces of transmission data for multiplexing, distributes the pieces of transmission data to a plurality of transmission antennas and then transmits them to a channel. On the other hand, a reception branch side spatially and temporally decodes a reception signal received by a plurality of receiving antennas via the channel, divides the reception signal into a plurality of pieces of transmission data and then acquires original data without crosstalk between streams. According to the MIMO communication scheme, it is possible to increase transmission capacity in accordance with the number of antennas without expanding a frequency band to thereby improve communication speed.

In wireless communication, generally, a preamble formed of repeated given sequences is added to the head of a packet. At the receiver side, the preamble is used to find the packet and carry out synchronization. In addition, as synchronization is completed at the preamble, control information (SIG information) described in a SIGNAL field of a subsequent header is decoded to acquire information necessary for data decoding, such as packet length, modulation scheme and encoding scheme.

A PHY layer of the above described IEEE802.11n has a high throughput (HT) transmission mode (hereinafter, also referred to as "HT mode") of which the packet transmission mode (Modulation and Coding Scheme: MCS), such as modulation scheme and encoding scheme, is totally different from that of the existing IEEE802.11a/g, and also has an operation mode (hereinafter, also referred to as "legacy mode") that carries out data transmission in the same packet format and the same frequency range as those of the existing IEEE802.11a/g. In addition, the HT mode may be divided into an operation mode called "Mixed Mode (MM)" compatible with an existing terminal (hereinafter also referred to as "legacy terminal") compliant with IEEE802.11a/g and an operation mode called "Green Field (GF)" incompatible with a legacy terminal. This means that there are three types of transmission formats, that is, a Legacy Format (LF), a Mixed Format (MF) and a Green Field Format (GF). Arrangement of SIG information, content of description and degree of reliability differ among these formats. For example, an MF packet is a multiple-format packet that has multiplexed preamble information in which an HT preamble is included subsequent to a legacy preamble.

A communication terminal, when receiving a packet, identifies the format and, in addition, determines the SIG information to carry out receiving operation. The HT terminal that operates in the HT mode is able to check a received packet using the SIG information (HT-SIG) in the HT preamble having a higher check level.

For example, a wireless communication scheme has been suggested in which a certain rule is set for information described in the L-SIG of an LF packet and an MF packet, and, when irregular information is described in the L-SIG, the HT terminal discards the information read from the L-SIG as invalid data even when no parity error is detected to thereby improve false positive detection accuracy (for example, see Japanese Unexamined Patent Application Publication No. 2008-10904).

On the other hand, for frames having a higher priority, such as when an RTS (Request To Send) frame receiving station returns a CTS (Clear To Send) frame, when a data frame receiving station returns an acknowledgement (ACK) frame, and the like, an extremely short inter-frame space (Short Inter-Frame Space: SIFS) is used. Thus, strict latency restrictions are imposed on a communication terminal that receives a packet so that the communication terminal should complete decoding of SIG information within SIFS (16 microseconds) to be ready for transmission.

SUMMARY OF THE INVENTION

It is desirable to provide an excellent wireless communication apparatus, wireless communication method and computer program that are able to favorably receive a packet in conformity with a predetermined standard format.

It is also desirable to provide an excellent wireless communication apparatus, wireless communication method and computer program that are able to efficiently identify the format of a received packet with a high degree of reliability and decode the received packet with high accuracy in a network environment in which a plurality of different packet formats are mixedly present.

It is further desirable to provide an excellent wireless communication apparatus, wireless communication method and computer program that are able to efficiently identify the format of a received packet with a high degree of reliability and decode the received packet with high accuracy in a network environment in which a plurality of different packet formats are mixedly present even under strict latency restrictions.

According to an embodiment of the invention, a wireless communication apparatus that operates in a network environment in which a plurality of different packet formats are mixedly present, includes: a first format detecting unit that detects a format by executing signal processing on a preamble of a received packet before decoding; an estimating unit that uses the preamble of the received packet to carry out multiple types of estimations; a decoding unit that decodes the received packet in accordance with the format detected by the first format detecting unit on the basis of the estimations carried out by the estimating unit; a second format detecting unit that detects the format of the received packet on the basis of control (SIG) information in the preamble of the received packet decoded by the decoding unit; an error detection determination unit that, when the format detected by the first format detecting unit differs from the format detected by the second format detecting unit, determines that the format detected by the first format detecting unit is error detection; and a control unit that controls operations of the estimating unit and the decoding unit on the basis of a result determined by the error detection determination unit.

In addition, according to the above embodiment of the invention, the wireless communication apparatus may further include: a checking unit that carries out parity check, frame check sequence (FCS), or cyclic redundancy check (CRC) on a signal that has been decoded by the decoding unit and that has been further error-corrected, wherein the second format detecting unit may detect the format of the received packet on the basis of the decoded control information that has been successfully checked by the checking unit.

In addition, according to the above embodiment of the invention, the wireless communication apparatus may further include: a buffer that accumulates necessary reception signal information for going back to execute multiple types of estimations by the estimating unit and decoding by the decoding unit, wherein the control unit may cause the estimating unit to execute the estimations and the decoding unit to execute the decoding in accordance with the format detected by the first format detecting unit as the packet is received, and may go back to cause the estimating unit to execute the estimations or the decoding unit to execute the decoding by reading the necessary reception signal information from the buffer as the error detection determination unit determines that the format detected by the first format detecting unit is error detection.

In addition, according to the above embodiment of the invention, the wireless communication apparatus may further include: a band detecting unit that detects the band of a packet before decoding; and a buffer that accumulates necessary reception signal information for going back to execute multiple types of estimations by the estimating unit and decoding by the decoding unit, wherein the control unit may compare the band detected by the band detecting unit with a band indicated by the decoded control (SIG) information in the preamble of the received packet, and, when the band detected by the band detecting unit does not coincide with the band indicated by the decoded control (SIG) information, may go back to cause the estimating unit to execute the estimations and the decoding unit to execute the decoding by reading the necessary reception signal information from the buffer.

According to another embodiment of the invention, a wireless communication apparatus that operates in a network environment in which a plurality of different packet formats are mixedly present, includes: a signal processing unit that executes signal processing in accordance with all packet formats; a format determination unit that determines the format of a received packet on the basis of decoded control (SIG) information in a preamble of the received packet; and a decoding unit that decodes only a reception signal processed by the signal processing unit in accordance with the packet format after the format has been determined by the format determination unit.

According to further another embodiment of the invention, a wireless communication apparatus that operates in a network environment in which a plurality of different packet formats are mixedly present, includes: a buffer that accumulates reception signal information before executing various signal processings; a decoding unit that decodes a reception signal; and a format determination unit that determines the format of a received packet on the basis of decoded control (SIG) information in a preamble of the received packet, wherein decoding is resumed by reading the reception signal information from the buffer after the format has been determined by the format determination unit.

In addition, according to the above embodiment of the invention, the wireless communication apparatus may further include: a checking unit that carries out parity check, frame check sequence (FCS), or cyclic redundancy check (CRC) on a signal that has been decoded by the decoding unit and that has been further error-corrected. Then, the buffer may accumulate the reception signal information up to around a time at which a check result is determined by the checking unit, and the format determination unit may determine the format of the received packet on the basis of the decoded control information that has been successfully checked by the checking unit.

In addition, according to the above embodiment of the invention, the wireless communication apparatus may further include: a band detecting unit that detects the band of a packet before decoding. Then, the band detected by the band detecting unit may be compared with a band indicated by the decoded control (SIG) information in the preamble of the received packet, and, when the band detected by the band detecting unit does not coincide with the band indicated by the decoded control (SIG) information, the necessary reception signal information may be read out from the buffer to go back to execute estimations by an estimating unit and the decoding by the decoding unit.

According to yet another embodiment of the invention, a wireless communication method in a network environment in which a plurality of different packet formats are mixedly present, includes the steps of: detecting the format of a received packet through signal processing on a preamble of the received packet before decoding; executing multiple types of estimations using the preamble of the received packet; accumulating necessary reception signal information in order to execute the multiple types of estimations and decoding; decoding the received packet in accordance with the detected format on the basis of the estimations; detecting the format of the received packet on the basis of the decoded control (SIG) information in the preamble of the received packet; when the format detected through signal processing before decoding differs from the format detected on the basis of the decoded control (SIG) information in the preamble of the received packet, determining that the format detected through signal processing before decoding is error detection, going back to execute the multiple types of estimations or the decoding using the accumulated necessary reception signal information as the format detected through signal processing before decoding is error detection.

According to further another embodiment of the invention, a wireless communication method in a network environment in which a plurality of different packet formats are mixedly present, includes the steps of: executing signal processing in accordance with all packet formats; determining the format of a received packet on the basis of decoded control (SIG) information in a preamble of the received packet; and decoding only a reception signal subjected to the signal processing in accordance with the determined packet format.

According to another embodiment of the invention, a wireless communication method in a network environment in which a plurality of different packet formats are mixedly present, includes the steps of: accumulating reception signal information before various signal processings; decoding a reception signal; and determining the format of a received packet on the basis of decoded control (SIG) information in a preamble of the received packet, wherein decoding is resumed by reading the reception signal information after the format has been determined.

According to further another embodiment of the invention, a computer program described in a computer readable format so as to execute wireless communication processing on a computer in a network environment in which a plurality of different packet formats are mixedly present, causing the computer to function as: a first format detecting unit that detects a format by executing signal processing on a preamble of a received packet before decoding; an estimating unit that uses the preamble of the received packet to carry out multiple types of estimations; a decoding unit that decodes the received packet in accordance with the format detected by the first format detecting unit on the basis of the estimations by the estimating unit; a buffer that accumulates necessary reception signal information in order to go back to execute the multiple types of estimations by the estimating unit and the decoding by the decoding unit; a second format detecting unit that detects the format of the received packet on the basis of control (SIG) information in the preamble of the received packet decoded by the decoding unit; an error detection determination unit that, when the format detected by the first format detecting unit differs from the format detected by the second format detecting unit, determines that the format detected by the first format detecting unit is error detection; and a control unit that causes the estimating unit to execute the estimations and the decoding unit to execute the decoding in accordance with the format detected by the first format detecting unit as the packet is received, and goes back to execute the estimations by the estimating unit or the decoding by the decoding unit by reading the necessary reception signal information from the buffer as the error detection determination unit determines that the format detected by the first format detecting unit is error detection.

According to yet another embodiment of the invention, a computer program described in a computer readable format so as to execute wireless communication processing on a computer in a network environment in which a plurality of different packet formats are mixedly present, causing the computer to function as: a signal processing unit that executes signal processing in accordance with all packet formats; a format determination unit that determines the format of a received packet on the basis of decoded control (SIG) information in a preamble of the received packet; and a decoding unit that decodes only a reception signal subjected to signal processing by the signal processing unit in accordance with the packet format after the format has been determined by the format determination unit.

According to another embodiment of the invention, a computer program described in a computer readable format so as to execute wireless communication processing on a computer in a network environment in which a plurality of different packet formats are mixedly present, causing the computer to function as: a signal processing unit that executes signal processing in accordance with all packet formats; a format determination unit that determines the format of a received packet on the basis of decoded control (SIG) information in a preamble of the received packet; and a decoding unit that decodes only a reception signal subjected to signal processing by the signal processing unit in accordance with the packet format after the format has been determined by the format determination unit, wherein decoding is resumed by reading the reception signal information from the buffer after the format has been determined by the format determination unit.

The computer program according to the above embodiments is the one that defines a computer program described in a computer readable format so as to implement a predetermined process on a computer. In other words, by installing the computer program according to the above embodiments on a computer, cooperative action is performed on the computer, and, therefore, functions and advantages similar to those of the wireless communication apparatus according to the above embodiments of the invention may be obtained.

With the embodiment of the invention, in a network environment in which a plurality of different packet formats are present, it is possible to provide an excellent wireless communication apparatus, wireless communication method and computer program that are able to efficiently identify the format of a received packet with a high degree of reliability and to accurately decode the received packet.

In addition, with the above embodiments of the invention, in a network environment in which a plurality of different packet formats are present, even under strict latency restrictions, it is possible to provide an excellent wireless communication apparatus, wireless communication method and computer program that are able to efficiently identify the format of a received packet with a high degree of reliability and to accurately decode the received packet.

With the above embodiments of the invention, it is possible to provide an excellent wireless communication apparatus, wireless communication method and computer program that are able to prepare for the next packet transmission even with a short inter-frame space by advancing decoding in accordance with an identification determination result having a low degree of reliability before identifying a packet using SIG information having a high degree of reliability.

With the above embodiments of the invention, when decoding is advanced in accordance with the format identification determination result having a low degree of reliability before identifying a packet using SIG information having a high degree of reliability, decoding is once started in accordance with the determination result having a low degree of reliability; however, when the determination result differs from a format identification output value based on the result that has passed through a checking method having a higher degree of reliability through signal processing thereafter, receiving operation is retried by going back to necessary various estimation calculations or decoding to make it possible to improve the decoding accuracy of the packet.

With the above embodiments of the invention, it is possible to satisfy strict latency restriction condition that the next packet transmission is prepared in an extremely short period of time by starting multiple types of estimations (synchronous timing detection, frequency offset estimation, noise estimation, and the like) and decoding of a received packet in accordance with a detected format before decoding, which is far from a situation that the degree of reliability is sufficiently high. In addition, with the above embodiments of the invention, second format detection is carried out on the basis of the decoded control information, so it is possible to improve packet decoding accuracy by determining whether the first format detection is error detection.

With the above embodiments of the invention, the second format detection detects the format of a received packet on the basis of decoded control information for which a corrected signal has been successfully checked through parity check, frame check sequence (FCS) or cyclic redundancy check (CRC), so the degree of reliability of the detection is sufficiently high. Thus, it is possible to improve packet decoding accuracy by accurately determining whether the first format detection is error detection.

With the above embodiments of the invention, the wireless communication apparatus includes a buffer that accumulates reception signal information up to around a time at which a CRC check result is determined. Then, multiple types of estimations and decoding of a received packet are started in accordance with the first format detection result, which is far from a situation that the degree of reliability is sufficiently high; however, when error detection is found on the basis of the second format detection result having a high degree of reliability, necessary reception signal information is read out from the buffer to go back to execute the multiple types of estimations and decoding. Thus, it is possible to improve packet decoding accuracy by returning to a receiving process of a correct packet format.

With the above embodiments of the invention, the first format detection is carried out in a band detected through correlation level detection, or the like, before decoding, and then multiple types of estimations and decoding of a received packet are started in accordance with the detected format, so it is possible to satisfy strict latency restriction condition. Then, when the band does not coincide with a band indicated by a value described in the SIG information obtained through decoding, multiple types of estimations and decoding are executed again in a correct band, so it is possible to improve packet decoding accuracy.

With the above embodiments of the invention, signal processing is executed in accordance with all packet formats until the format of a received packet is determined to thereby satisfy strict latency restriction condition; however, after the format has been determined, decoding is carried out only on the target format to make it possible to reduce power consumption.

With the above embodiments of the invention, reception signal information before various signal processings is accumulated, and, after the format has been determined, the reception signal information is read out from the buffer to make it possible to resume decoding.

With the above embodiments of the invention, the buffer accumulates reception signal information up to around a time at which a check result is determined through CRC, or the like, of the SIG portion. In addition, the format determination unit determines the format of a received packet on the basis of the decoded control information that has been successfully checked through CRC, or the like, of the SIG portion, so it is possible to improve packet decoding accuracy.

With the above embodiments of the invention, when the band detected through correlation level detection, or the like, before decoding does not coincide with a band indicated by a value described in SIG information obtained through decoding, multiple types of estimations and decoding are executed again in a correct band, so it is possible to improve packet decoding accuracy.

Other objects, features and advantages of the embodiments of the invention may be apparent from the following further detailed description with reference to an embodiment of the invention and accompanying drawings.

BRIEF DESCRIPTION OF THE DRAWINGS

FIG. 1A is a view that shows the configuration example of an MIMO receiver (first half) according to one embodiment of the invention;

FIG. 5 is a view that shows the format of an L-SIG field;

FIG. 15 is a view that shows an example of a latency taken for return and process symbols when the band is erroneously detected although the packet is exactly an MF packet;

FIG. 16 is a view that shows an example of a latency taken for return and process symbols when the band is erroneously detected although the packet is exactly a GF packet;

DESCRIPTION OF THE PREFERRED EMBODIMENTS

Hereinafter, an embodiment of the invention will be described in detail with reference to the accompanying drawings.

Figure 1B:
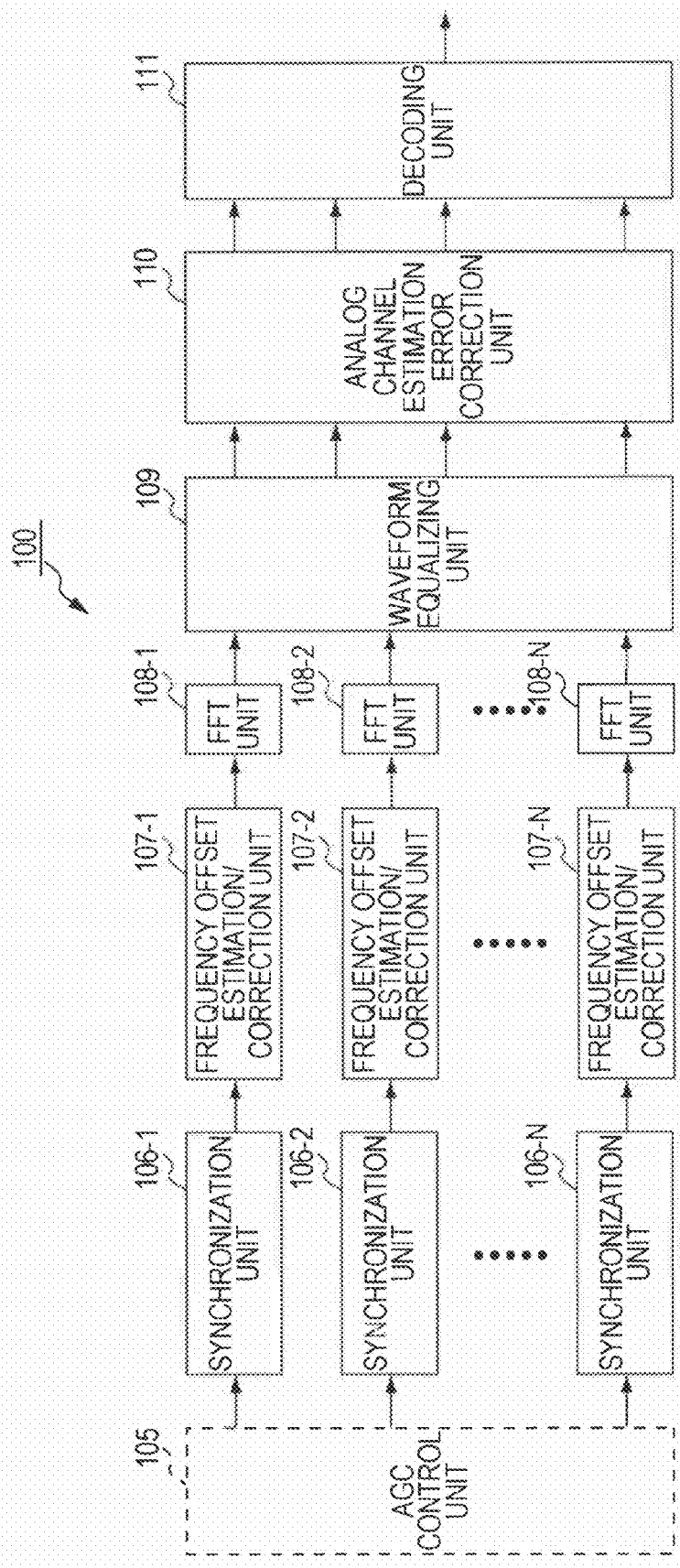
FIG. 1B is a view that shows the configuration example of the MIMO receiver (second half) according to the embodiment of the invention.

FIG. 1A and FIG. 1B show the configuration example of an MIMO_OFDM receiver according to an embodiment of the invention. The number of antennas (or the number of receiving branches) of a receiver 100 shown in the drawing is N. The N is four at the maximum when the receiver 100 is, for example, in compliant with IEEE specifications. It is assumed that the receiver 100 described below receives a packet in which a stream of each transmission branch is beamforming transmitted.

Data that have reached the receiving branches of the receiver 100 through a channel are initially subjected to analog processing at RF units 101 in the respective receiving antenna branches. Each RF unit 101 executes amplification using a low noise amplifier (LNA), downconverts a reception signal in an RF frequency band, performs AGC (automatic gain control) that normalizes electric power of a reception signal so as to fall within the dynamic range of a corresponding one of the AD converters 102, removes signal components, other than a desired band, using an analog low-pass filter (LPF), or the like.

After an analog reception signal is converted into a digital signal by each AD converter (ADC) 102, the digital signal is input to a corresponding one of digital filters 103 and then a low-frequency component is removed.

In regard to a DC offset and IQ imbalance correction unit 104, for example, when the RF units 101 employ a direct conversion mode, because a reception frequency is equal to a local frequency, a direct-current component, that is, a DC offset, occurs in a downconverter output due to self-mixing of a local signal. In addition, in the direct conversion mode, no IF (intermediate frequency) signal is included in a digital region, and IQ modulation is performed not in the digital region but in an analog region, so IQ imbalance occurs due to a component of which in-phase (I) and quadrature (Q) is imbalance. Correction of DC offset and IQ imbalance is indispensable for maintaining the accuracy of the following frequency offset estimation, packet detection, and timing detection.

The AGC control unit 105 performs gain control of the AGC in each RF unit 101. Specifically, the absolute value of each of I-axis amplitude and Q-axis amplitude of a reception signal is evaluated. Then, when the absolute value is not the maximum value of each AD converter 102 or not close to the maximum value, the input reception signal is fed back to the AD converter 102. However, when the absolute value of each of the amplitudes is the maximum value of each AD converter 102 or close to the maximum value, a predetermined value that is about several times the absolute value of each of the amplitude maximum values of the AD converter 102 is fed back to the AD converter 102.

Each synchronization unit 106 detects a rough synchronous timing through self-correlation process in an interval (L-STF) in which a relatively short training sequence (L-STS) is burst transmitted in the preceding stage of a preamble, and determines a detailed synchronous timing through cross-correlation process in an interval (L-LTF) in which a relatively long training sequence (L-LTS) is burst transmitted in the following stage of the preamble.

Note that each synchronization unit 106 executes process, such as noise level (or SNR) estimation, in association with detection of a synchronous timing. For example, after a packet is detected in the L-STF interval, signal electric power and noise electric power are calculated in the L-LTF interval at a repeated period of LTS to make it possible to estimate SNR.

Each frequency offset estimation/correction unit 107 estimates a frequency offset included in a reception signal of each branch and corrects the frequency offset. For example, autocorrelation is obtained in the L-LTF interval at a repeated period of LTS, and the phase rotation amount of each repeated period of LTS is measured. Thus, it is possible to estimate a frequency offset.

Each FFT unit 108 removes a guard interval attached to the head of a data transmission interval and then performs fast fourier transform (FFT) on a reception signal on a time-axis to transform the reception signal into a frequency-axis signal.

The waveform equalizing unit 109 performs waveform equalization on a beam-formed reception signal. Specifically, an estimation channel matrix H is composed from a training sequence for exciting a channel sequence, received by each receiving branch. Then, an antenna reception weighted matrix W is calculated on the basis of the obtained channel matrix H, matrix multiplication is performed between a reception vector, having received streams as elements, and the antenna reception weighted matrix W to spatially decode a spatially multiplexed signal, and then obtains a signal sequence independent of each stream.

Note that a method of calculating the antenna reception weighted matrix W may be an MMSE (Minimum Mean Square Error) algorithm that calculates the reception weighted matrix W from the channel matrix H on the basis of the logic that maximizes the ratio of signal electric power to square error (sum of crosstalk electric power and noise electric power), that is, SNR. Other than that, the method may be an MLD (Maximum Likelihood Detection) algorithm that matches with all possible transmission signal sequence patterns to estimate the most likely transmission sequence or a method of performing singular value decomposition (SVD) from the channel matrix H to $UDV^H$.

The analog channel estimation error correction unit 110 uses a pilot sub-carrier included in a data symbol to estimate a residual frequency offset, correct the offset, carry out channel tracking, or the like, over a signal sequence of each stream. The estimated amount of the residual frequency offset is fed back to the frequency offset estimation/correction unit 107 of each branch and is removed from the reception signal of each branch.

As the decoding unit 111 demaps the reception signal on an IQ signal space and, in addition, deinterleaves the reception signal and then depunctures it at a predetermined data rate, the decoding unit 111 synthesizes a plurality of received streams to a single stream and then outputs the single stream.

Note that each block that carries out digital signal processing is controlled by a time-base controller (TBC) (not shown), and it is assumed that time at which a process should be started, time at which the process is terminated, a parameter necessary for the process, or the like, is timely input from the TBC to each block.

Subsequently, a packet format used in the communication scheme will be described. A PHY layer of the IEEE802.11n has a high throughput (HT) transmission mode (hereinafter, also referred to as "HT mode") of which the packet transmission mode (Modulation and Coding Scheme: MCS), such as modulation scheme and encoding scheme, is totally different from that of the existing IEEE802.11a/g, and also has an operation mode (hereinafter, also referred to as "legacy mode") that carries out data transmission in the same packet format and the same frequency range as those of the existing IEEE802.11a/g. In addition, the HT mode is divided into an operation mode called "Mixed Mode (MM)" compatible with an existing terminal (hereinafter also referred to as "legacy terminal") compliant with IEEE802.11a/g and an operation mode called "Green Field (GF)" incompatible with a legacy terminal.

Figure 2:
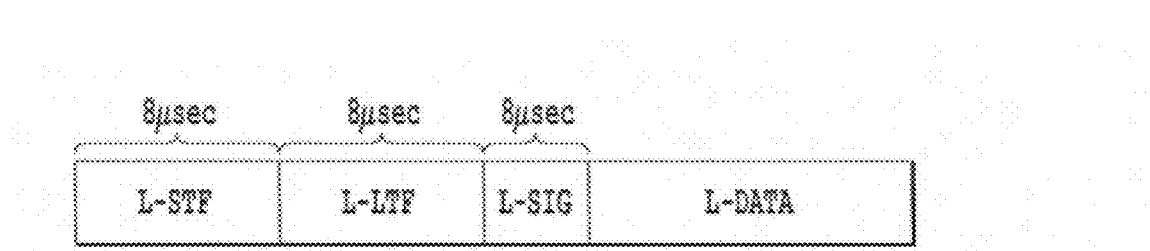
FIG. 2 is a view that shows a packet format in a legacy mode.
Figure 3:
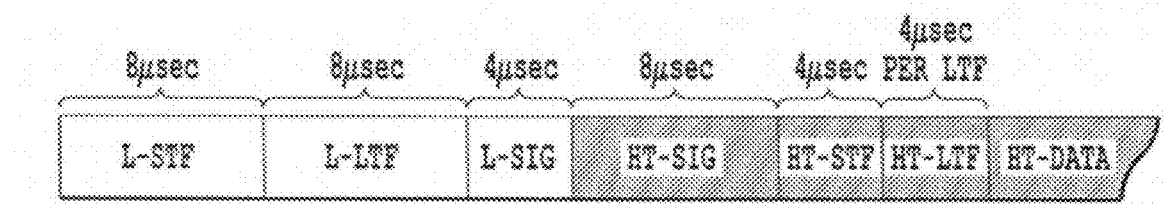
FIG. 3 is a view that shows a packet format in an MM mode.
Figure 4:
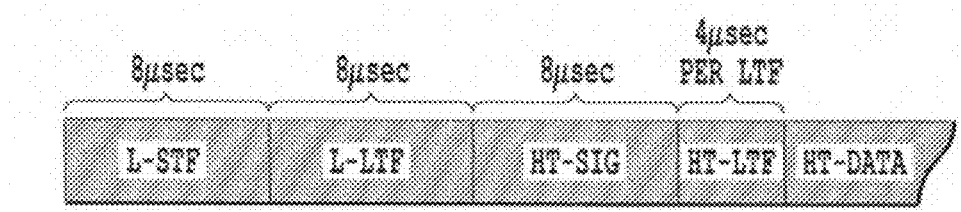
FIG. 4 is a view that shows a packet format in a GF mode.

FIG. 2 to FIG. 4 respectively show packet formats in operation modes of the legacy mode, MM mode and GF mode. However, in each drawing, one OFDM symbol corresponds to 4 microseconds.

A packet in the legacy mode (hereinafter, also referred to as "legacy packet") shown in FIG. 2 is the same format as that of IEEE802.11a/g. The header portion of the legacy packet includes, as a legacy preamble, an L-STF (Legacy Short Training Field) formed of a given OFDM symbol for packet detection, an L-LTF (Legacy Long Training Field) formed of a given training symbol for synchronization and equalizing, and an L-SIG (Legacy SIGNAL Field) in which a transmission rate, data length, and the like, are described. Subsequent to the header portion, a payload (Data) is transmitted.

In addition, the header portion of a Mixed Format packet (hereinafter, also referred to as "MF packet") shown in FIG. 3 includes a legacy preamble formed of the same format as that of IEEE802.11a/g, a subsequent preamble, formed of a format specific to IEEE802.11n (hereinafter, also referred to as "HT format"), and a data portion. The MF packet may be regarded such that a portion corresponding to a PHY payload in the legacy packet is formed in the HT format and the HT format is recursively formed of an HT preamble and a PHY payload.

The HT preamble includes HT-SIG, HT-STF and HT-LTF. In the HT-SIG, control information necessary for interpreting the HT format, such as a transmission mode (MCS) applied to the PHY payload (PSDU) and the data length of the payload, is described. In addition, the HT-STF is formed of a training symbol for improving AGC (automatic gain control) in the MIMO system. In addition, the HT-LTF is formed of a training symbol for calculating a channel matrix by estimating a channel for each input signal that is spatially modulated (mapped) at the receiver side.

Note that, in the case of MIMO communication that uses two or more transmission branches, it is necessary to acquire a channel matrix by estimating a channel for each transmission/reception antenna to spatially separate the reception signal at the receiver side. Therefore, at the transmitter side, the HT-LTF is transmitted from each transmission antenna in a time-sharing manner. Thus, one or more HT-LTF fields are attached in accordance with the number of spatial streams.

The legacy preamble in the MF packet has the same format as the preamble of the legacy packet and is transmitted in a transmission mode that can be decoded by a legacy terminal. In contrast, the HT format portion following the HT preamble is transmitted in a transmission mode that is incompatible with the legacy terminal. The legacy terminal is able to decode the L-SIG in the legacy preamble of the MF packet to read that it is not intended for the local station, data length information, and the like, and then set NAV (Network Allocation Vector) of an appropriate length, that is, transmission standby period, to avoid collision. As a result, the MF packet is able to implement compatibility with the legacy terminal. However, the MM packet has a legacy preamble portion, so the format is redundant and is disadvantageous in terms of throughput.

In addition, the packet shown in FIG. 4 (hereinafter, also referred to as "GF packet") is formed of only an HT format portion. The preamble of the GF packet includes an L-STF field for packet detection, an HT-LTF field for channel estimation, an HT-SIG field in which information necessary for interpreting the HT format is described, and a second HT-LTF field. In the MIMO communication, it is necessary to acquire a channel matrix by estimating a channel for each spatial stream, so the HT-LTF corresponding to the number of transmission antennas is transmitted in the second HT-LTF field in a time-sharing manner (same as above). The GF packet is incompatible with the legacy terminal at all; however, the GF packet includes no legacy preamble, so it is possible to implement a throughput higher than the MM packet.

FIG. 5 shows the format of the L-SIG field. As shown in the drawing, in the L-SIG, control information necessary for decoding a packet in the legacy format, such as a transmission rate (RATE) and a packet length (LENGTH), is described. In addition, the L-SIG is provided with a parity check mechanism (even parity is performed on zeroth to 16th bits at the 17th bit from the upper level); however, the parity check mechanism has only 1 bit, so there is quite a high possibility that the HT-SIG in the GF packet is erroneously received as the L-SIG. In addition, if the HT-SIG is erroneously interpreted as the L-SIG, the fifth to 16th bits of the first symbol HT-SIG are read as Length.

Figure 6:
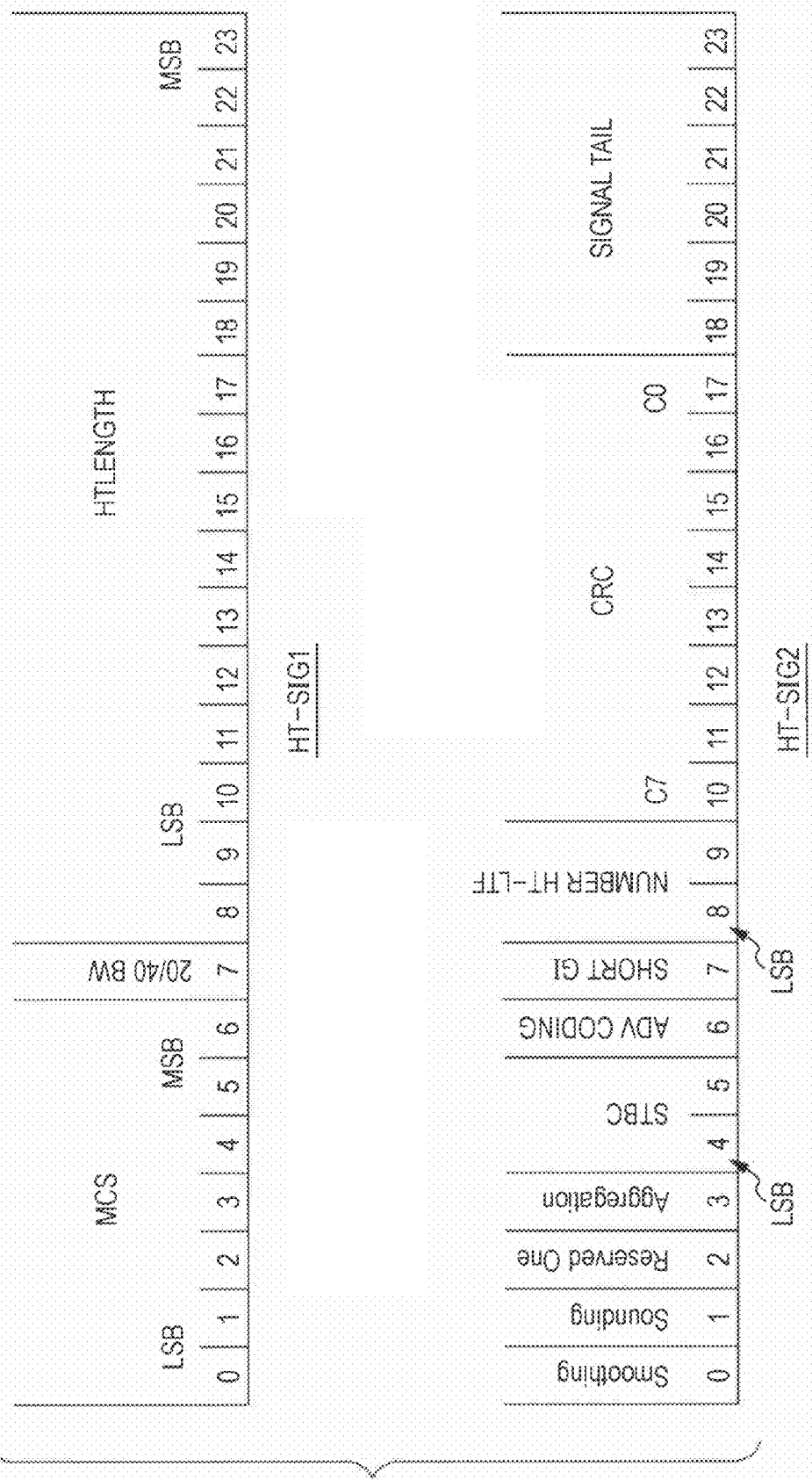
FIG. 6 is a view that shows the data structure of an HT-SIG field.

In addition, FIG. 6 shows the data structure of the HT-SIG field. As shown in the drawing, the HT-SIG is formed of two OFDM symbols, and then the first symbol is set as an HT-SIG1 and the second symbol is set as an HT-SIG2. In the HT-SIG, control information necessary for interpreting the HT format, such as a transmission mode (MCS) applied to the PHY payload (PSDU) and the data length of the payload, is described. In any of the MF packet and the GF packet, the content of description in the HT-SIG field is the same. Definition of each field in the HT-SIG is shown in the following Table.

| Field Name | Num of Bits | Explanation and coding |
|---|---|---|
| MCS | 7 | Index into The MCS table, LSB first |
| BW 20/40 | 1 | 0 if 20 MHz or 40 MHz upper/lower; 1 if 40 MHz |
| Length | 16 | The number of bytes of data in the PSDU-0*-65535 |
| Smoothing | 1 | 1-channel estimate smoothing is allowed 0-Only per-carrier independent (unsmoothed) channel estimate is recommended |

-continued

| Field Name | Num of Bits | Explanation and coding |
|---|---|---|
| Sounding | 1 | Indicates that the packet is a sounding packet. 0- Sounding Packet 1- 1-Not a sounding packet |
| reserved one | 1 | set to 1 |
| Aggregation | 1 | Set to 1 to indicate that the PPDU in the data portion of the packet contain an A-MPDU. Set to 0 otherwise |
| STBC | 2 | Indicates the difference between either the number pf space time streams $N_{STS}$ and the number of spatial streams $N_{SS}$ indicated by the MCS 00-No STBC ($N_{STS} = N_{SS}$) |
| Advanced Coding | 1 | 1-LDPC 0-BCC. |
| Short GI | 1 | Indicate that the short GI is used after the HT training |
| Number of Extension HT-LTF | 2 | Number of extension spatial stream(s) $N_{ESS}$. -b' 00-no extension spatial stream, b' 01-1 additional spatial stream, b' 10 2 additional streams, b' 11 3 additional spatial streams. |
| CRC | 8 | CRC of bits 0-23 in HT-SIG1 and bits 0-9 in HT-SIG2 |
| Tail Bits | 6 | Used to terminate the trellis of the convolution coder. Set to 0 |

The MF packet is a packet format that guarantees compatibility with a legacy terminal. The shaded fields in the packet formats shown in FIG. 3 and FIG. 4 are fields that do not guarantee compatibility with legacy standards. The legacy terminal is able to decode the L-SIG field of the MF packet; however, the legacy terminal is not able to read a MAC header (in the HT-DATA field), so it is difficult to acquire Duration information that indicates a period during which transmission should be standby. Then, in the MF packet, the transmission rate (Rate) and packet length (Length) information are spoofed in the L-SIG that can be received by the legacy terminal to wait before transmission for a corresponding period of time (for example, see paragraph [0127] in Japanese Unexamined Patent Application Publication No. 2008-118692 that has been already transferred to the applicant of this application).

Figure 7:
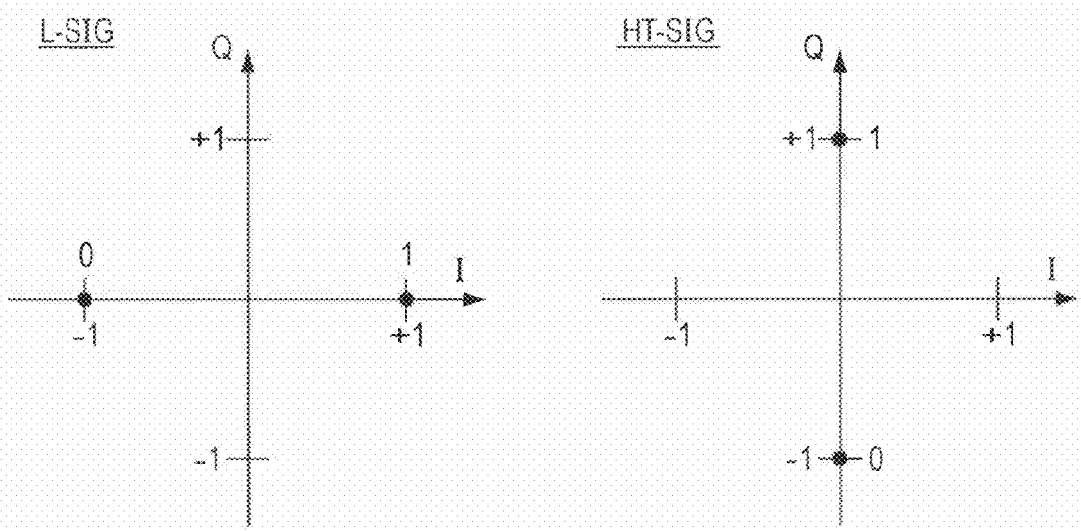
FIG. 7 is a view for illustrating the mechanism of performing BPSK modulation of the HT-SIG field on a phase space rotated by 90 degrees with respect to the L-SIG field.

The HT-SIG fields shown in FIG. 3 and FIG. 4 perform BPSK modulation on a phase space that is rotated by 90 degrees with respect to the L-SIG field (or preceding or following field) (see FIG. 7). Such rotation of the phase space is regulated in order to distinguish the legacy packet from the MF packet.

The position of an OFDM symbol that is phase-rotated to perform BPSK modulation differs between the MF packet and the GF packet. As FIG. 3 and FIG. 4 are compared with each other, the MF packet is subjected to BPSK modulation in which the fourth and fifth OFDM symbols corresponding to HT-SIG are phase-rotated by 90 degrees, whereas the GF packet is subjected to BPSK modulation in which the third to fourth OFDM symbols corresponding to HT-SIG are phase-rotated by 90 degrees. Note that a method of determining which the packet is, an MF packet or an GF packet, for example, described in Japanese Unexamined Patent Application Publication No. 2007-221500 that has been already transferred to the applicant of the present application. However, the scope of the invention is not limited to the above method that determines which the HT packet is, an MF packet or a GF packet.

Figure 8:
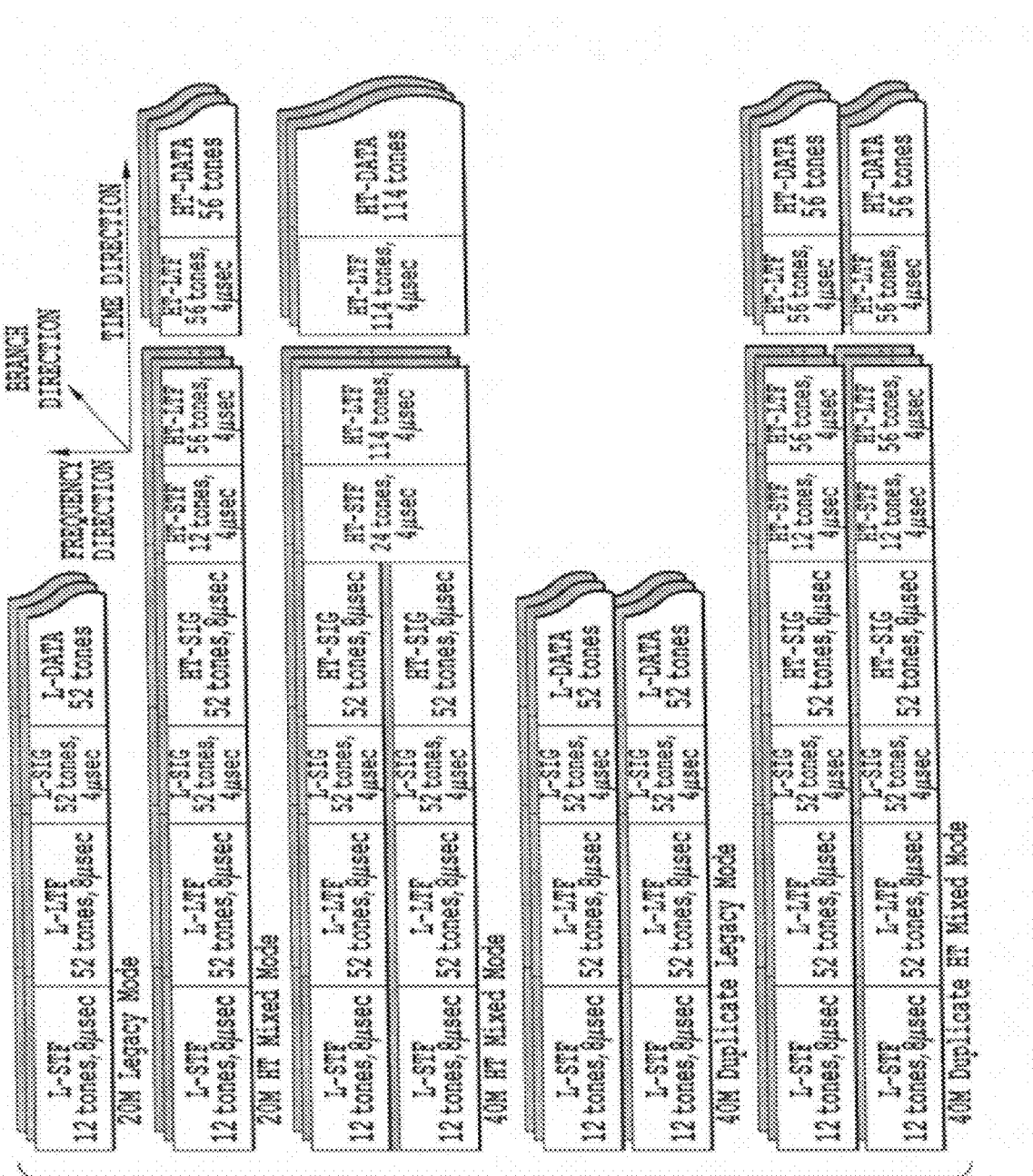
FIG. 8 is a view that shows the packet format of IEEE802.11n.

In addition, in regard to the legacy mode and the MM mode, as shown in FIG. 8, five types of packet formats in total are present depending on a combination of the format and the band width. In other words, at the receiver side, before decoding a packet, it is necessary to detect the band of the packet.
(1) Legacy Mode that uses 20 MHz band (in the example shown in the drawing, 3×3×1 configuration)
(2) HT Mixed Mode that uses 20 MHz band (in the example shown in the drawing, 3×3×N configuration)
(3) HT Mixed Mode that expands the band width to 40 MHz band (in the example of the drawing, 3×3×N configuration)
(4) 40M Duplicate Legacy Mode that overlappingly uses the lower 20 MHz band (lower band) and the upper 20 MHz band (upper band) within 40 MHz band (in the example shown in the drawing, 3×3×1 configuration)
(5) 40M Duplicate HT Mixed Mode that overlappingly uses the lower 20 MHz band (lower band) and the upper 20 MHz band (upper band) within 40 MHz band (in the example shown in the drawing, 3×3×N configuration)

As the receiver shown in FIG. 1 detects an incoming packet, the receiver identifies the format and, in addition, determines SIG information to perform receiving operation. In addition, the receiver is an HT terminal, and is able to check a received packet using a higher check level HT-SIG.

However, the receiver should complete decoding of the SIG information within SIFS (16 microseconds) to prepare for the next packet transmission. Under the above strict latency restrictions, in order for the receiver to execute decoding, before error-corrected SIG information that has passed a check and that has a high check level is determined, it is necessary to carry out automatic identification of which the degree of reliability is lower than that of the SIG information and then proceed with decoding in accordance with the identification determination result of this low degree of reliability.

For example, it is conceivable that measures such as (1) the once processed OFDM is carried out again and (2) parallel decoding is performed in consideration of the possibility of all packet formats until the SIG information having a high degree of reliability is determined; however, any methods are not general in the existing art.

In addition, in the full GI mode, a signal processing method that executes data driven process and that executes FFT process at an interval of four microseconds is general. Thus, it is not general that a process is stopped until the SIG information having a high degree of reliability is determined and then decoding is started after the SIG information is determined.

In contrast, in the present embodiment, when the receiver proceeds with decoding in accordance with a format identification determination result having a low degree of reliability, the receiver once starts decoding in accordance with the packet identification determination result having a low degree of reliability. However, when it differs from a format identification output value based on the result that has passed through a check method having a higher degree of reliability and that is obtained through a signal processing process thereafter, the process goes back to necessary various estimation calculations and decoding to retry receiving operation, thus improving packet decoding accuracy.

Figure 9:
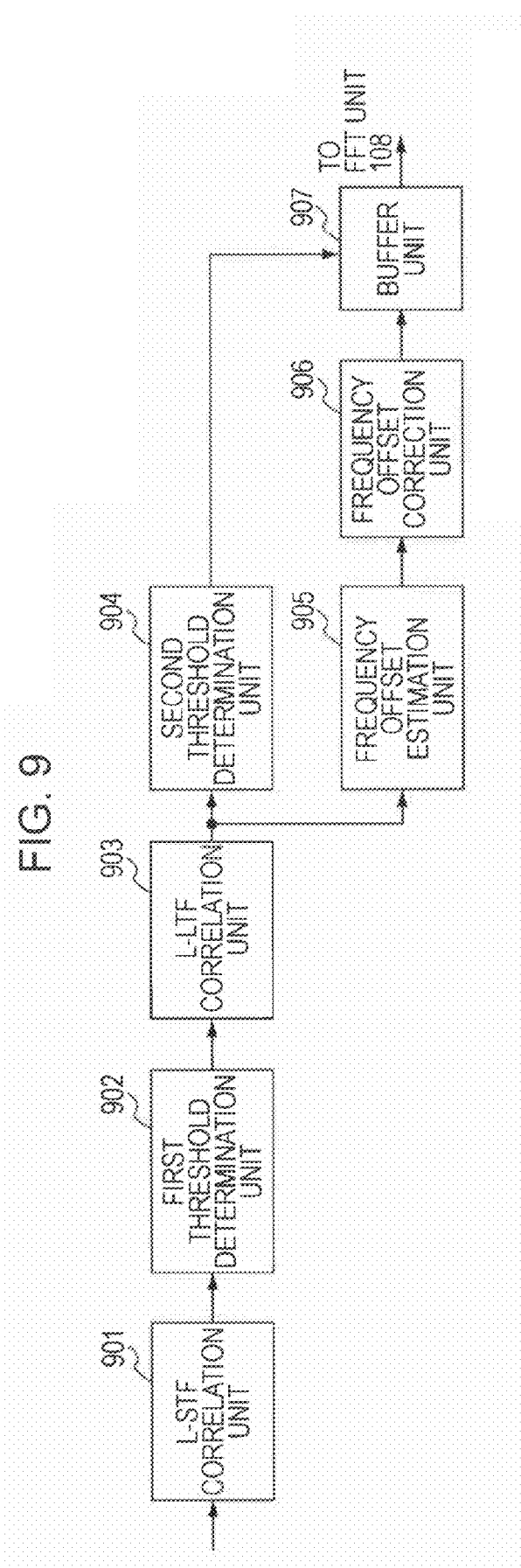
FIG. 9 is a view that shows the details of the configuration around each synchronization unit 106 and each frequency offset estimation/correction unit 107 of a receiver 100 shown in FIG. 1.

FIG. 9 shows the detailed configuration around each synchronization unit 106 and each frequency offset estimation/correction unit 107 of the receiver 100 shown in FIG. 1. However, in the above drawing, in order to avoid complexity of the drawing, only one branch is drawn.

An L-STF correlation unit 901 performs auto-correlation operation in an L-STF interval in which L-STS is burst transmitted. Then, a first threshold determination unit 902 detects a rough synchronous timing of a received packet on the basis of a result obtained by determining the auto-correlation value with respect to a threshold.

Subsequently, an L-LTF correlation unit 903 performs cross-correlation operation in an L-LTF interval in which the L-LTS is burst transmitted. Then, the second threshold determination unit 904 acquires the detailed synchronous timing of a received packet on the basis of a result that is obtained by determining the cross-correlation value with respect to a threshold.

Note that the L-STF correlation unit 901, the first threshold determination unit 902, the L-LTF correlation unit 903 and the second threshold determination unit 904 correspond to components of each synchronization unit 106 shown in FIG. 1.

In addition, the frequency offset estimation unit 905, for example, obtains auto-correlation at a repeated period of LTS in an L-LTF interval to measure the phase rotation amount of each repeated period of LTS, thus estimating a frequency offset. Then, the frequency offset correction unit 906 removes the estimated frequency offset amount from the reception signal.

Note that the frequency offset estimation unit 905 and the frequency offset correction unit 906 correspond to components of each frequency offset estimation/correction unit 107 shown in FIG. 1.

The buffer unit 907 is arranged at an input stage of each FFT unit 108, and accumulates reception signal information before being subjected to various signal processings as the detailed synchronous timing is determined. When the packet identification determination result having a low degree of reliability differs from the format identification output value having a higher degree of reliability based on the SIG information thereafter, the reception signal information stored here is used when going back to execute necessary various estimation operations and decoding to retry receiving operation. The buffer unit 907 accumulates reception signal information until around a time at which CRC check result of the SIG information is determined.

Figure 10:
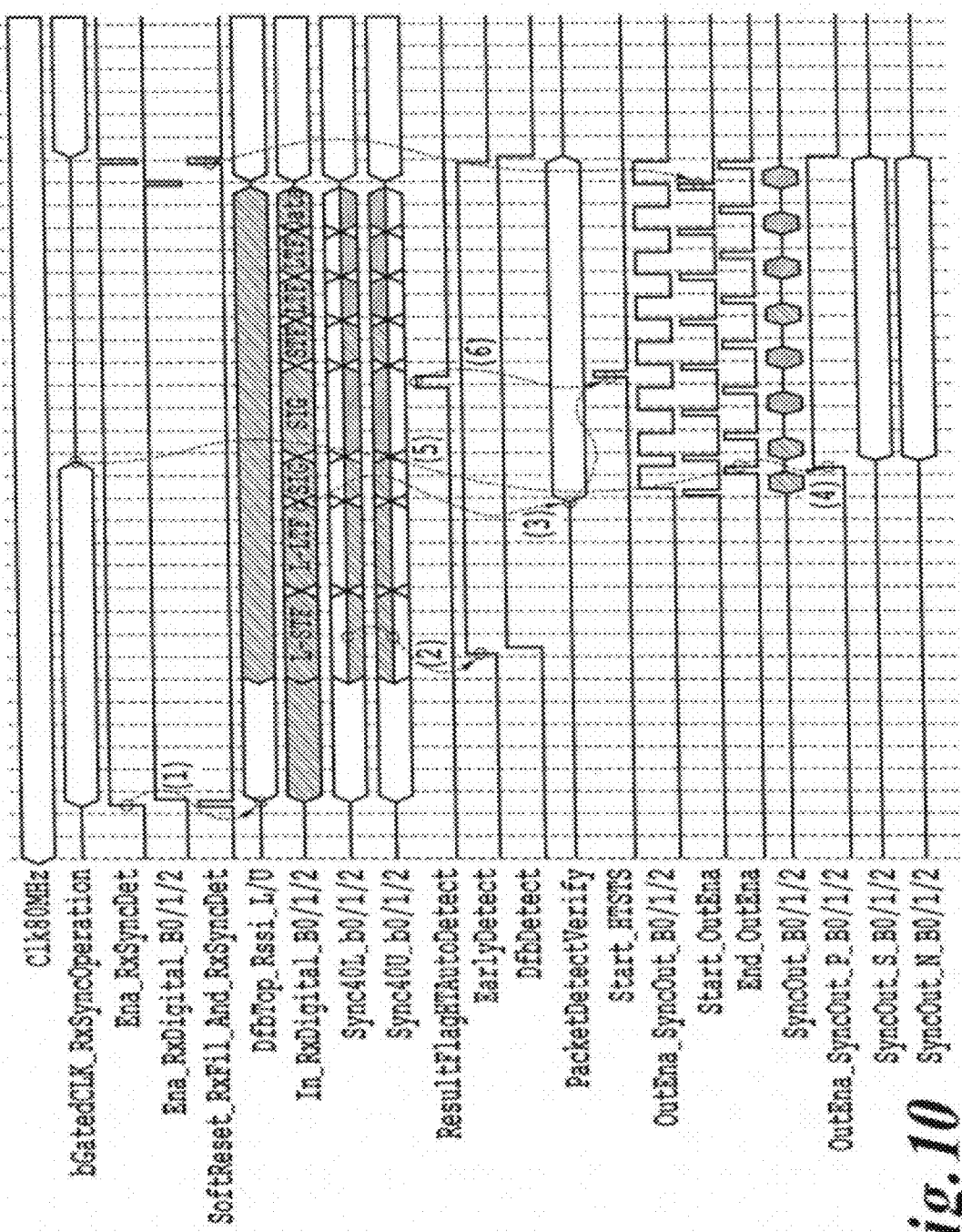
FIG. 10 is a timing chart that shows the procedure in which the receiver receives packets of respective formats, that is, a legacy packet, an MF packet and a GF packet.

Next, synchronization procedure when the receiver 100 receives the MF packet will be described with reference to FIG. 10. Each synchronization unit 106 stores a received packet waveform in the buffer unit 907 while dividing the received packet waveform into an OFDM symbol period and then outputting them to the following signal processing unit in accordance with the following procedure.

(1) Each synchronization unit 106 starts operation in response to assertion of an Enable signal from low level to high level. That is, each synchronization unit 106 performs synchronization on a receiving branch n that is indicated to be effective through Ena_Rx Digital_B0/1/2 . . . n.

(2) Because of a request of CCA (Clear Channel Assessment), a threshold is set so that EarlyDetect and DfbDetect are asserted to high level in four microseconds from the leading end of the L-STF interval. (In Dfb detection, Early detection (early detection of a packet), receiving gain control, DC offset removal, and the like, are performed.)

(3) PacketDetectVerify is output at a timing that is 16 microseconds from the leading end of the packet and around which the L-LTF interval terminates. This value also indicates a specification band determination result of 20 MHz/40 MHz of the received packet.

(4) After reception of the L-LTF interval is completed, the measured synchronous timing and frequency offset are determined and then the L-LTF that has been subjected to frequency correction and that has been averaged between the preceding and following ones is output. 40 MHz sample signal is output at a double speed 80 MHz.

(5) Hereinafter, leaving the processes, such as writing of the reception signal to the buffer unit 907, reading of the reception signal from the buffer unit 907, and frequency correction of the reception signal, each synchronization unit 106 stops.

(6) For the HT packet, it is adjusted to slightly early output HT-SIG.

Each synchronization unit 106 detects a packet by drawing up to L-LTF, so an output interval between L-LTF and L-SIG is narrow. In addition, each synchronization unit 106 delays the output of L-SIG to a degree such that it does not influences the output of H-SIG, thus achieving adjustment so as not to delay decoding time of the entire received packet. It may be understood from the timing chart shown in FIG. 10, in the interval other than L-LTF or L-SIG, it is only necessary that each synchronization unit 106 outputs a reception signal at a constant interval in accordance with an OFDM symbol period.

Next, the procedure for identifying the packet format of IEEE802.11n will be described.

Figure 11:
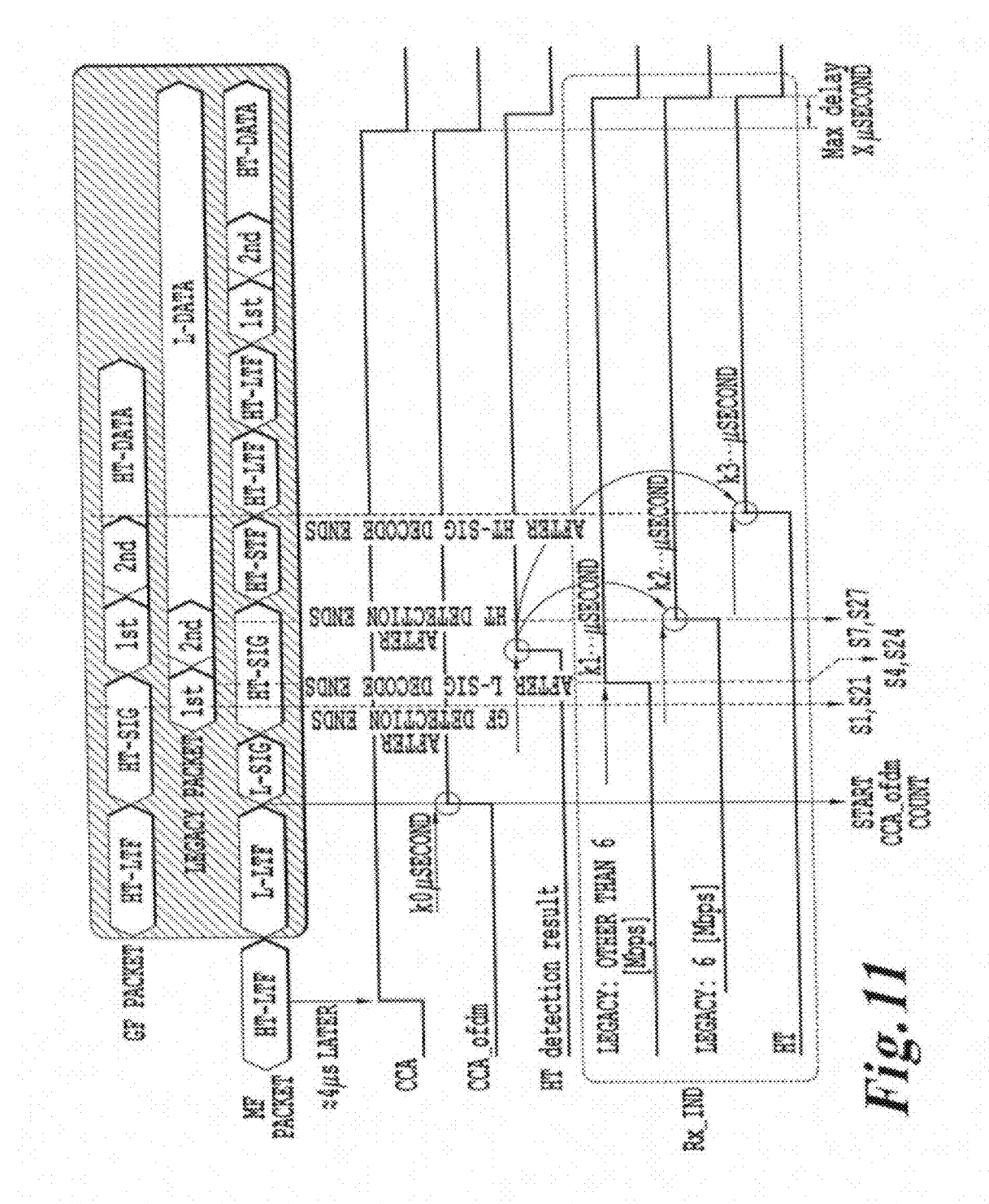
FIG. 11 is a timing chart that shows the procedure in which the receiver receives packets of respective formats, that is, a legacy packet, an MF packet and a GF packet.

FIG. 11 shows a timing chart of the procedure in which the receiver receives packets of respective formats, that is, a legacy packet, an MF packet and a GF packet.

In any of the packet formats, the receiver uses an L-STF field in which a short training symbol is burst transferred to detect a packet (rough synchronous timing detection). In addition, the receiver asserts CCA within four microseconds from the leading end of the packet.

For the legacy packet and the MF packet, a subsequent L-LTF field is used to carry out detailed synchronous timing detection to determine synchronization at the terminal end of the field. Then, at time k0 [microseconds] corresponding to the terminal end of the L-LTF field, CCAofdm count is asserted. The CCA_ofdm count is a signal for rising detection, and is necessary to determine the packet format before determination of rising. In addition, at this time point, any one of the reception modes is determined from among 20 MHz band, 40 MHz upper band, 40 MHz lower band and 40 MHz entire band.

Subsequently, for the GF packet, it is possible to detect that the packet is the GF packet around the fourth OFDM symbol from the leading end, corresponding to the second half of H-SIG (GF detection).

In addition, for the legacy packet or the MF packet, decoding of L-SIG (L-SIG decode) completes around the fourth OFDM symbol from the leading end. Hereinafter, this time is set at k1 [microseconds].

In the GF packet, HT-SIG is the third and fourth symbols. In the MF packet, HT-SIG is the fourth and fifth symbols. In the case of the HT packet, detection of the packet format (HT detection) completes around the fifth symbol. This time is set at k2 [microseconds] in the following description.

In addition, in the MF packet, the HT preamble includes HT-STF, formed of a training symbol for improving AGC, after HT-SIG. Decoding of HT-SIG (HT-SIG decode) terminates around the terminal end of the HT-STF field. In the following description, this time is set at k2 [microseconds]. When the received packet is a legacy format and the transmission rate is other than 6 Mbps, a packet reception indicator (Rx_Ind) is asserted at time k1. In addition, when the received packet is a legacy format and the transmission rate is 6 Mbps, in response to assertion of the detection result of the HT packet (HT detection result), a packet reception indicator (Rx_Ind) is asserted at time k2. In addition, when the received packet is an HT format, in response to assertion of the detection result of HT packet (HT detection result), a packet reception indicator (Rx_Ind) is asserted at time k3.

Figure 12:
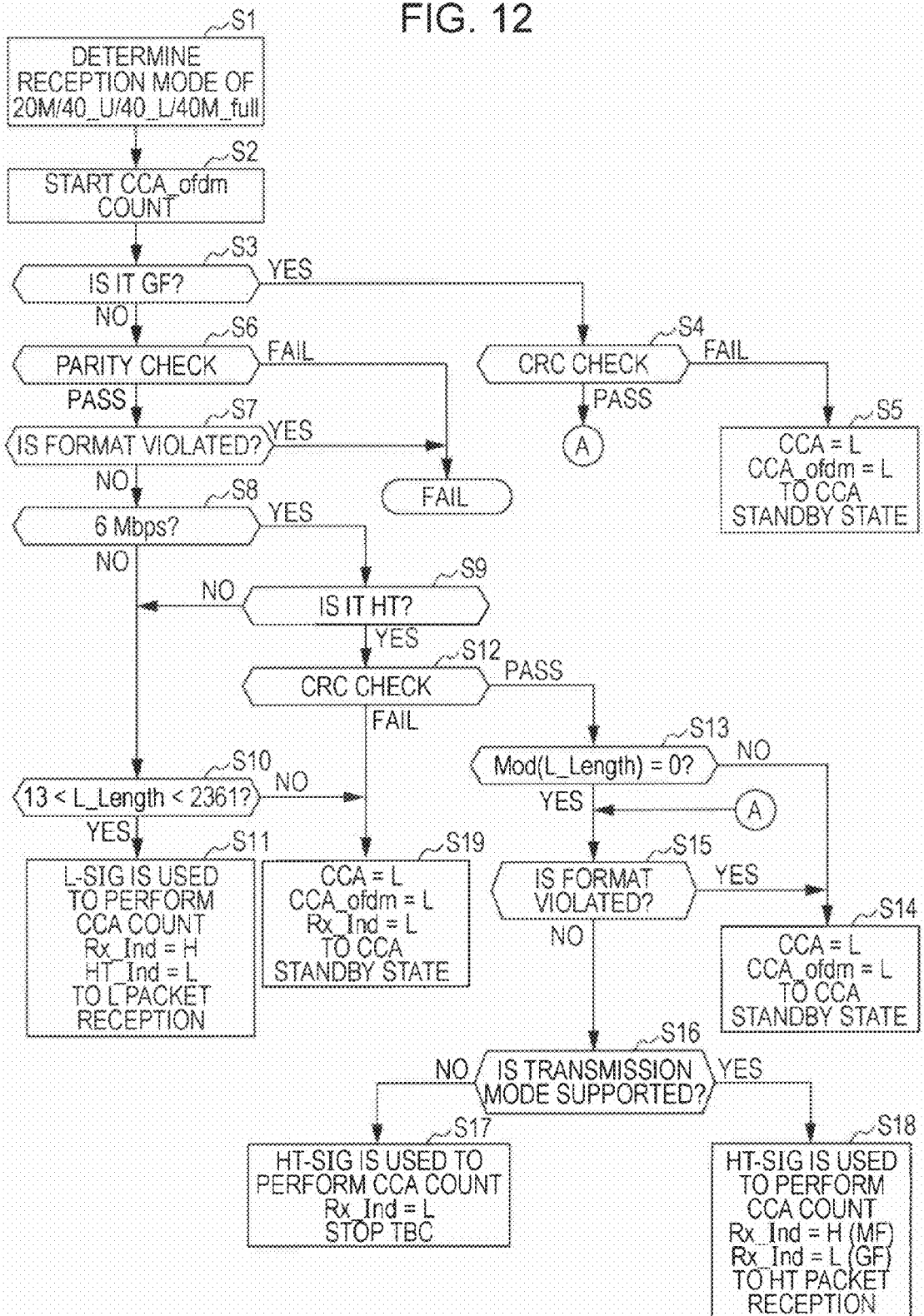
FIG. 12 is a flowchart that shows an example of the procedure in which the receiver that operates in the MM mode of IEEE802.11n measures a transmission termination time of a received packet in correspondence with all modulation schemes and encoding schemes indicated by SIGNAL information including a packet transmission mode that is not supported by the host terminal.

FIG. 12 shows an example of the procedure in which the receiver that operates in the MM mode of IEEE802.11n measures a transmission termination time of a received packet in correspondence with all modulation schemes and encoding schemes indicated by SIGNAL information, including a packet transmission mode that is not supported by the host terminal, in the form of flowchart.

At time k0, it is determined which reception mode the received packet is from among 20 MHz, 40 MHz lower band, 40 MHz upper band, 40 MHz entire band on the basis of correlation level detection on the preamble portion of the packet (step S1). In addition, at the same timing, the CCA_ofdm count starts (step S2).

Then, around the fourth OFDM symbol corresponding to the HT-SIG2 field of the GF packet, it is determined whether the received packet is a GF format on the basis of Q-BPSK determination at the SIG portion (see the above and FIG. 7) (step S3).

Here, when it is determined that the received packet is a GF format (Yes in step S3), CRC check in the HT-SIG field is further performed (step S4). Then, when CRC check is unsuccessful (Fail in step S4), CCA and CCA_ofdm are set to low level, that is, negated to return to a CCA standby state (step S5), after which the process routine ends.

In addition, when it is determined that the received packet is not a GF format (No in step S3), the L-SIG field (L-SIG decode) is decoded, and parity check in the L-SIG is performed (step S6). Then, when a parity error is detected, it is regarded that packet reception fails, after which the process routine ends. Here, even parity is used. However, there is a possibility that, because of a bit error, or the like, parity check may be passed even when a packet reception error is actually occurring.

When no parity error is detected in the L-SIG (Pass in step S6), it is further checked whether the content of Rate information or Length information in the L-SIG field violates the format (step S7). When the content violates the format, the received packet is discarded, and then the process routine ends.

On the other hand, when the content of the L-SIG conforms to the defined format (No in step S7), it is checked whether the Rate information of the L-SIG specifies 6 Mbps as a transmission rate of the packet (step S8).

When the Rate information in the L-SIG indicates 6 Mbps (Yes in step S8), the received packet may be an HT packet (MF packet) or a legacy packet. Then, at the time k2, it is determined which HT format the received packet is (HT detection) on the basis of Q-BPSK determination of the HT-SIG portion (see the above and Japanese Unexamined Patent Application Publication No. 2007-221500) (step S9). A method of determining which is the packet, the MF packet or the GF packet, is described, for example, in Japanese Unexamined Patent Application Publication No. 2007-221500 (as described above); however, the scope of the invention is not limited to this method.

When it is determined that the Rate information in the L-SIG does not indicate 6 Mbps in step S8, or when it is determined that the received packet is a legacy packet in step S9, it is checked whether the Length information described in the L-SIG field falls within the prescribed range (step S10). Then, when the Length information falls within the prescribed range, receiving process is performed as a legacy packet (step S11). That is, the transmission termination time of the received packet is measured on the basis of the Rate information and Length information in the L-SIG field to start CCA count, while setting Rx_Ind to high level, that is, asserting Rx_Ind to set HTInd to low level, that is, negate HTInd.

In addition, when it is determined that the received packet is an HT packet (that is, an MF packet) in step S9, at time k3, HT-SIG field (HT-SIG decode) of the MF packet is decoded, while performing CRC check in the HT-SIG (step S12).

When it is determined in step S10 that the Length information in the L-SIG falls outside the prescribed range, or when CRC check in the HT-SIG fails in step S10, all CCA, CCA_ofdm and Rx_Ind are set to low level, that is, negated to return to a CCA standby state (step S19), after which the process routine ends.

When the CRC check in the HT-SIG in step S12 is passed, it is subsequently checked whether the Length information in the L-SIG field is a value divisible by three as defined in IEEE802.11 (step S13).

When it is determined in step S12 that the Length information in the L-SIG is a value divisible by three, or when CRC check in the HT-SIG of the HT packet (GF packet) is passed in step S2, it is checked whether the content in the L-SIG field violates the format (step S15).

In addition, when it is determined in step S13 that the Length information is not a value divisible by three, or when it is determined in step S13 that the HT-SIG violates the format, CCA and CCA_ofdm are set to low level, that is, negated, to return to a CCA standby state, after which the process routine ends (step S14).

On the other hand, when the content of the HT-SIG conforms to the defined format (No in step S15), it is subsequently checked whether the host terminal supports the transmission rate and transmission mode specified by MCS in the HT-SIG field (step S16).

Then, when the host terminal supports the transmission rate and transmission mode specified by MCS in the HT-SIG field (Yes in step S16), the HT-SIG is used to measure CCA count, that is, the transmission termination time of the received packet, to receive the HT packet (step S18). At this time, when the received packet is an MF format, RX_Ind is set to high level, that is, asserted, whereas, when the received packet is a GF format, RX_Ind is set to low level, that is, negated.

On the other hand, when the host terminal does not support the transmission rate and transmission mode specified by MCS in the HT-SIG field (No in step S16), the HT-SIG is used to measure CCA count, that is, the transmission termination time of the received packet, as usual without using the L-SIG (step S17). At this time, Rx_Ind is set to low level, that is, negated, and the operation of the time-base controller (described above) is stopped. As the time-base controller stops, the operations of the blocks that perform digital signal processing are stopped to achieve low power consumption.

In the procedure shown in FIG. 11, the following five format identification determinations are carried out sequentially. The degree of reliability in each identification determination is also shown.

Figure 13:
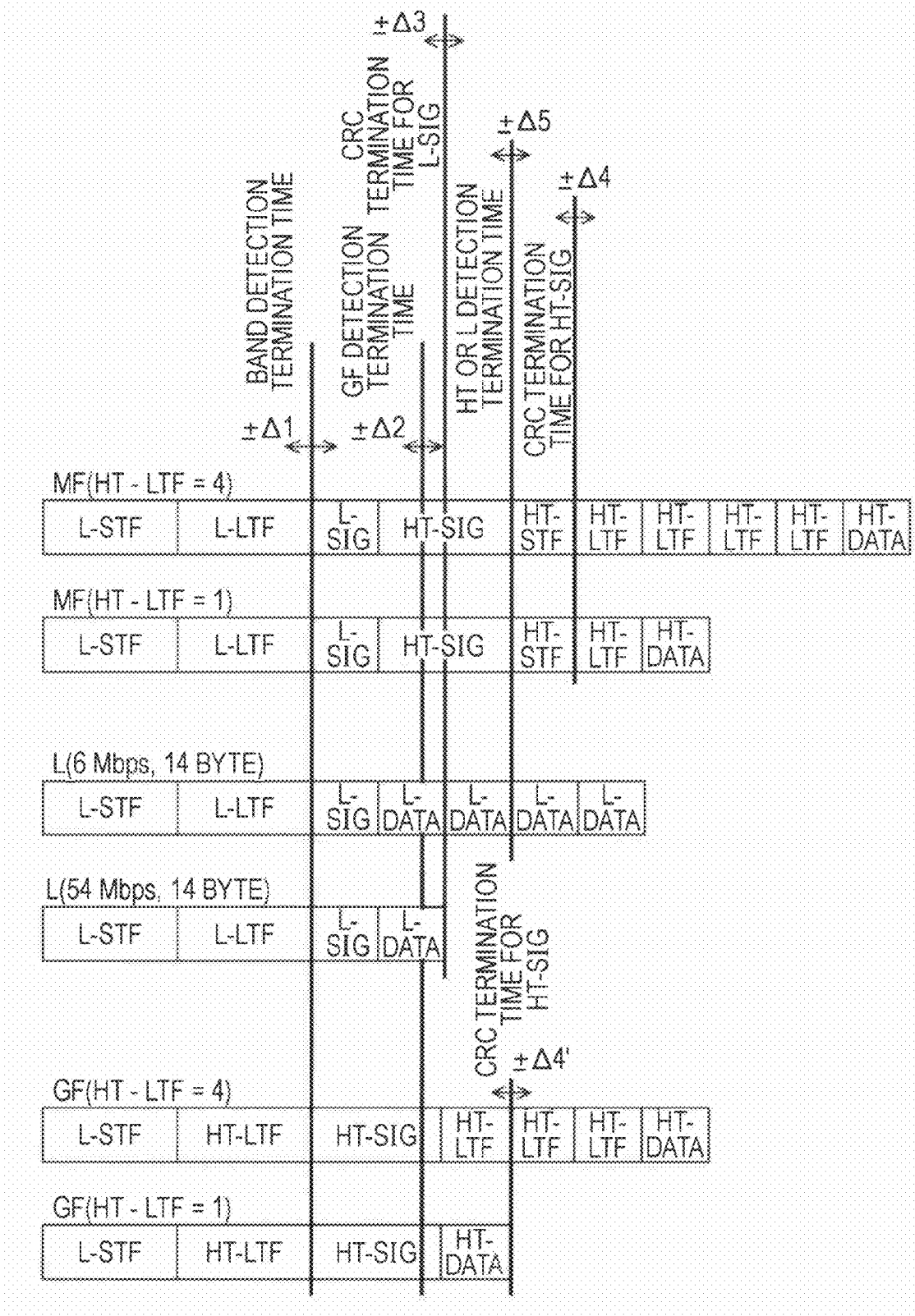
FIG. 13 is a view that shows the timings at which respective packet format identification determinations are carried out in various packet formats of IEEE802.11n.

(1) Band detection of a received packet using correlation level detection on the preamble portion, executed in step S1: low degree of reliability (2) GF packet determination (Green Field detection) using Q-BPSK determination of the SIG portion, executed in step S3: intermediate degree of reliability (3) Decoding of the L-SIG including parity check, executed in step S6: high degree of reliability (4) Q-BPSK determination of the HT-SIG portion, executed in step S9: intermediate degree of reliability (5) Decoding of the HT-SIG portion including CRC check, executed in step S12: high degree of reliability Various packet formats of IEEE802.11n and timings at which packet format identification determination of the above (1) to (5) is carried out are shown in FIG. 13.

In the procedure shown in FIG. 12, even when format identification till then is turned out to be error detection by determination of the SIG information according to the above (5), it is difficult to return from the error detection case.

In contrast, the above described method is conceivable in which decoding is once started in accordance with a determination result having a low degree of reliability; however, when it differs from a format identification output value that is obtained through signal processing thereafter and that is based on a result that has passed through a detection method having a higher degree of reliability, the process goes back to necessary various estimation calculations and decoding to retry receiving operation. According to this method, it is possible to improve packet decoding accuracy.

FIG. 14A to FIG. 14E show flowcharts of the procedure that includes a process of retrying and restore a receiving operation at the time when erroneous detection of a packet format is detected. In this case, the buffer unit 907 arranged at an input stage of each FFT unit 108 accumulates reception signal information before various signal processings as the detailed synchronous timing is determined.

At time k0, it is determined which reception mode the received packet is from among 20 MHz, 40 MHz lower band, 40 MHz upper band, 40 MHz entire band by detecting a band on the basis of correlation level detection on the preamble portion of the packet (step S21). In addition, at the same timing, the CCA_ofdm count starts (step S22).

Then, around the fourth OFDM symbol corresponding to the HT-SIG2 field of the GF packet, it is determined whether the received packet is a GF format on the basis of Q-BPSK determination in the SIG portion (see the above and FIG. 7) (step S23).

Here, when it is determined that the received packet is a GF format (Yes in step S23), CRC check in the HT-SIG field is further performed (step S24).

Band detection in step S21 has a low degree of reliability, and Q-BPSK determination of the SIG portion in step S23 has an intermediate degree of reliability, whereas CRC check of HT-SIG in step S24 has a high degree of reliability. Therefore, it may be assumed that, although the packet is exactly a legacy packet or an MF packet, the process proceeds to step S24 and then preceding packet format identification determination may be overturned by CRC check of HT-SIG.

In the procedure shown in FIG. 12, when CRC check of HT-SIG fails, the process routine just ends, and it is difficult to return from error detection. In contrast, in the procedure shown in FIG. 14A to FIG. 14E, in order to go back to signal processing of L-LTF and its following of the legacy packet or MF packet, reception signal information accumulated in the buffer unit 907 is read out (step S25) and then the process proceeds to step S26.

When it is determined that the received packet is not a GF format (No in step S23), or when CRC check of the HT-SIG portion fails in step S24, the L-SIG field (L-SIG decode) is decoded, and parity check in the L-SIG is performed (step S26).

Figure 14A:
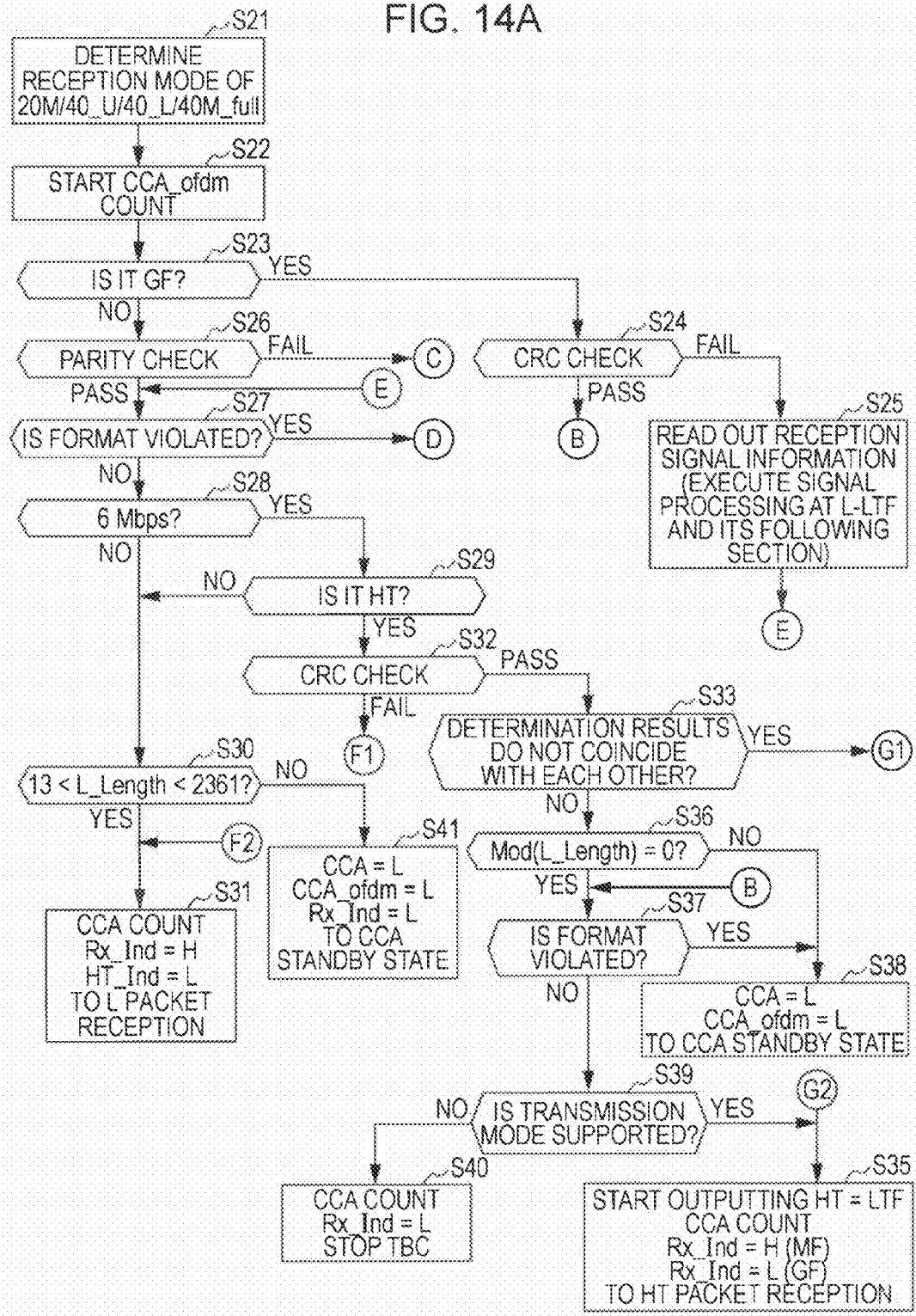
FIG. 14A is a flowchart that shows another example of the procedure in which the receiver that operates in the MM mode of IEEE802.11n measures a transmission termination time of a received packet in correspondence with all modulation schemes and encoding schemes indicated by SIGNAL information including a packet transmission mode that is not supported by the host terminal.
Figure 14B:
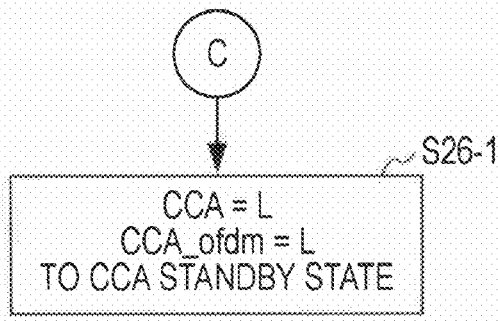
FIG. 14B is a flowchart that shows another example of the procedure in which the receiver that operates in the MM mode of IEEE802.11n measures a transmission termination time of a received packet in correspondence with all modulation schemes and encoding schemes indicated by SIGNAL information including a packet transmission mode that is not supported by the host terminal.

The degree of reliability of parity check in the L-SIG is sufficiently high. When a parity error is detected in step S26, CCA and CCA_ofdm are set to low level, that is, negated, to return to a CCA standby state (step S26-1: FIG. 14B), after which the process routine ends.

When no parity error in the L-SIG is detected (Pass in step S26), it is further checked whether the content of Rate information or Length information in the L-SIG field violates the format (step S27).

Figure 14C:
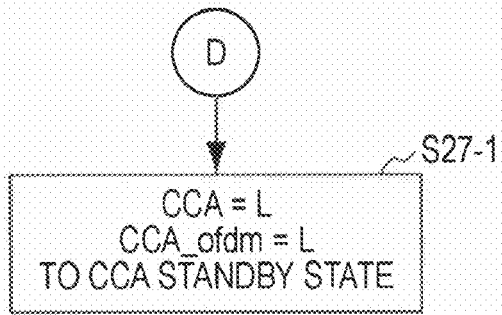
FIG. 14C is a flowchart that shows another example of the procedure in which the receiver that operates in the MM mode of IEEE802.11n measures a transmission termination time of a received packet in correspondence with all modulation schemes and encoding schemes indicated by SIGNAL information including a packet transmission mode that is not supported by the host terminal.

The degree of reliability of the determination process in step S27 is sufficiently high because it is based on the decoded L-SIG information. Thus, when the format is violated, CCA and CCA_ofdm are set to low level, that is, negated, to return to a CCA standby state (step S27-1: FIG. 14C), after which the process routine ends.

On the other hand, when the content of the L-SIG conforms to the defined format (No in step S27), it is checked whether the Rate information of the L-SIG specifies 6 Mbps as a transmission rate of the packet (step S28).

When the Rate information in the L-SIG indicates 6 Mbps (Yes in step S28), the received packet may be an HT packet (MF packet) or a legacy packet. Then, at the time k2, it is determined which HT format the received packet is (HT detection) on the basis of Q-BPSK determination of the HT-SIG portion (see the above and Japanese Unexamined Patent Application Publication No. 2007-221500) (step S29).

When it is determined that the Rate information in the L-SIG does not indicate 6 Mbps in step S28, or when it is determined that the received packet is a legacy packet in step S29, it is checked whether the Length information described in the L-SIG field falls within the prescribed range (step S30).

Then, when the Length information of L-SIG falls within a prescribed range (Yes in step S30), the transmission termination time of the received packet is measured on the basis of the Rate information and Length information in the L-SIG (step S31). In addition, CCA count is started, Rx_Ind is set to high level, that is, asserted, and HTInd is set to low level, that is, negated, to carry out receiving process for a legacy packet.

On the other hand, when it is determined in step S30 that the Length information in the L-SIG falls outside the prescribed range, all CCA, CCA_ofdm and Rx_Ind are set to low level, that is, negated to return to a CCA standby state (step S41), after which the process routine ends.

In addition, when it is determined that the received packet is an HT packet (that is, an MF packet) in step S29, HT-SIG field (HT-SIG decode) of the MF packet is decoded, while performing CRC check in the HT-SIG (step S32).

Figure 14D:
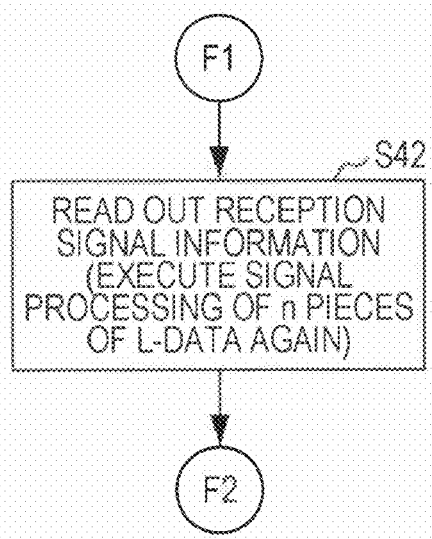
FIG. 14D is a flowchart that shows another example of the procedure in which the receiver that operates in the MM mode of IEEE802.11n measures a transmission termination time of a received packet in correspondence with all modulation schemes and encoding schemes indicated by SIGNAL information including a packet transmission mode that is not supported by the host terminal.

Q-BPSK determination of the HT-SIG portion in step S29 has an intermediate degree of reliability. Therefore, it may be assumed that, although the packet is a legacy packet, the packet is handled as an MF packet and then determination process in step S32 fails. In the procedure shown in FIG. 12, when CRC check of HT-SIG fails, the process routine just ends, and it is difficult to return from error detection. In contrast, in the procedure shown in FIG. 14A to FIG. 14E, in order to go back to signal processing following n L-LTFs, the reception signal information accumulated in the buffer unit 907 is read out (step S42: FIG. 14D), and the process proceeds to step S31, thus returning to receiving process of not an MF packet but a legacy packet.

When it is determined in step S30 that the Length information in the L-SIG falls outside the prescribed range, or when CRC check in the HT-SIG fails in step S30, all CCA, CCA_ofdm and Rx_Ind are set to low level, that is, negated to return to a CCA standby state (step S37), after which the process routine ends.

When the CRC check in the HT-SIG in step S32 is passed, the decoded result (flag value of BW20/40 field) of the HT-SIG information is subsequently compared with the determination result of a reception mode based on the band detection in step S21 (step S33).

Band detection in step S21 has a low degree of reliability, whereas determination process in step S32 is based on the decoded HT-SIG information and has a high degree of reliability. Thus, it may be assumed that the determination result in step S21 does not coincide with the result obtained from the HT-SIG information for which CRC check has been successfully performed, that is, packet format identification determination in step S21 is overturned.

Figure 14E:
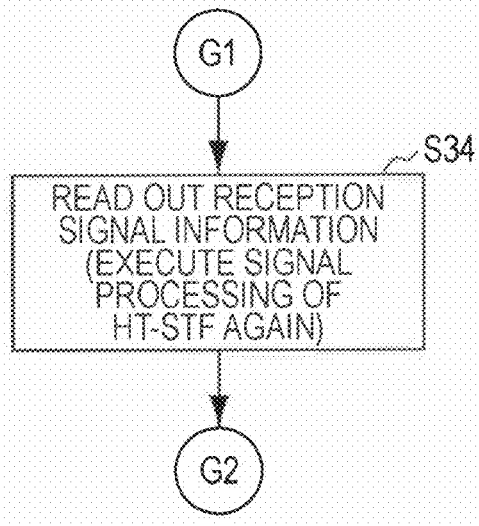
FIG. 14E is a flowchart that shows another example of the procedure in which the receiver that operates in the MM mode of IEEE802.11n measures a transmission termination time of a received packet in correspondence with all modulation schemes and encoding schemes indicated by SIGNAL information including a packet transmission mode that is not supported by the host terminal.

Then, when both determination results do not coincide with each other (Yes in step S33), HT-STF accumulated in the buffer unit 907 is read out and then signal processing, such as AGC improvement in the MIMO system, is executed again (step S34: FIG. 14E), after which receiving process for an HT packet is executed (step S35). At this time, the buffer unit 907 starts outputting HT-LTF to a corresponding one of the FFT units 108. At this time, when the received packet is an MF format, RX_Ind is set to high level, that is, asserted, whereas, when the received packet is a GF format, RX_Ind is set to low level, that is, negated.

On the other hand, when the result of the band detection on the preamble portion executed in step S21 coincides with the decoded HT-SIG portion (No in step S33), it is subsequently checked whether the Length information in the L-SIG field is a value divisible by three as defined in IEEE802.11 (step S36).

When it is determined in step S36 that the Length information in the L-SIG is a value divisible by three, or when CRC check in the HT-SIG of the HT packet (GF packet) is passed in step S24, it is checked whether the content in the L-SIG field violates the format (step S37).

In addition, when it is determined in step S36 that the Length information is not a value divisible by three, or when it is determined in step S37 that the HT-SIG violates the format, CCA and CCA_ofdm are set to low level, that is, negated, to return to a CCA standby state, after which the process routine ends (step S38).

On the other hand, when the content of the HT-SIG does not violate the defined format (No in step S37), it is subsequently checked whether the host terminal supports the transmission rate and transmission mode specified by MCS in the HT-SIG field (step S39).

Then, when the host terminal supports the transmission rate and transmission mode specified by MCS in the HT-SIG field (Yes in step S39), the L-SIG (only in the case of the MF packet) or the HT-SIG is used to measure CCA count, that is, the transmission termination time of the received packet, to receive the HT packet (step S35). At this time, when the received packet is an MF format, RX_Ind is set to high level, that is, asserted, whereas, when the received packet is a GF format, RX_Ind is set to low level, that is, negated.

On the other hand, when the host terminal does not support the transmission rate and transmission mode specified by MCS in the HT-SIG field (No in step S39), CCA count, that is, the transmission termination time of the received packet is measured. At this time, Rx_Ind is set to low level, that is, negated, and the operation of the time-base controller (described above) is stopped (step S40). As the time-base controller stops, the operations of the blocks that perform digital signal processing are stopped to achieve low power consumption.

In the procedure shown in FIG. 14A to FIG. 14E, the following five format identification determinations are carried out sequentially. The degree of reliability in each identification determination is also shown.

(1) Band detection of a received packet using correlation level detection on the preamble portion, executed in step S21: low degree of reliability
(2) GF packet determination (Green Field detection) using Q-BPSK determination of the SIG portion, executed in step S23: intermediate degree of reliability
(3) Decoding of the L-SIG including parity check, executed in step S26: high degree of reliability
(4) Q-BPSK determination of the HT-SIG portion, executed in step S29: intermediate degree of reliability
(5) Decoding of the HT-SIG portion including CRC check, executed in step S32: high degree of reliability A packet identification determination result having a low degree of reliability, carried out in the first half of packet receiving process, such as band detection that uses correlation level detection on the preamble portion or packet format detection that uses Q-BPSK determination at the SIG portion, may not coincide with a packet identification determination result having a high degree of reliability based on the decoded SIG information thereafter.

As described above, in the procedure shown in FIG. 14A to FIG. 14E, when the packet identification determination result having a low degree of reliability is overturned by the following packet identification determination result having a high degree of reliability, the process goes back to execute necessary various estimation operations and decoding again and then the process is restored on the basis of the correct packet identification determination result, so it is possible to improve the reliability of various identification determination points.

Specifically, three loops correspond to this process, that is, a loop in which, when CRC check of the GFHT-SIG portion in step S24 fails, the process returns to step S26 via step S25, a loop in which, when CRC check of the MFHT-SIG portion in step S32 fails, the process returns to step S31 that executes receiving process of a legacy packet via step S41, and a loop in which, when the band detection result in step S21 does not coincide with the decoded HT-SIG portion in step S32, signal processing of HT-STF is executed again in step S34 and then the process returns to receiving process of an HT packet in step S35.

Hereinafter, a buffer size, a target symbol, or the like, necessary for going back the process in each return method will be described in detail.

First, a method of returning from error detection of a band detection result in step S21, having a lowest reliability, will be described.

FIG. 15 is a view that shows an example of a latency taken for return and process symbols when the band is erroneously detected although the packet is exactly an MF packet (in the drawing, the symbol indicated in gray color corresponds to a symbol to which the process goes back to handle).

When it is found in step S33 that the packet is exactly an MF packet, it is only necessary that, at the time of return, the reception signal information accumulated in the buffer unit 907 is read out, the process goes back to handle the HT-STF to execute multiple types of estimations, such AGC improvement and noise level estimation, again. Here, the point that the return process is terminated within an allowable latency (here, it is defined to be X microseconds) taken for receiving process of a PHY layer is that, when it is difficult to prepare inverse matrix calculation for carrying out MMSE waveform equalizing process in consideration of a channel matrix calculated from HT-LTF and a noise level, it is difficult to start processes at the FFT and its following processes. The allowable latency X is 16 microseconds (described above) from SIFS restrictions. For example, as shown at the lower row in FIG. 15, when the packet is an MF packet of which the number of HT-LTFs is 1 (that is, the number of streams of MIMO is 1), as erroneous band detection is found, the process goes back to handle HT-STF to carry out noise estimation, and uses the subsequent HT-LTF to calculate a channel matrix, and then further executes inverse matrix calculation for MMSE waveform equalizing process in consideration of re-estimated noise level, thus executing waveform equalizing process over the immediately following HT-DATA portion.

Thus, in order for the receiving process of an MF packet to correctly return from erroneous band detection, the following two methods are conceivable.

(1) A method in which, for recalculation, calculation resources allocated exclusively to an MF packet are provided in parallel with normal calculation resources to perform high-speed calculation, and a noise level estimated value is calculated so as to be able to start inverse matrix calculation at substantially the same timing as that when return is not attempted (2) A method in which, while the following symbol information is buffered, channel matrix estimation and noise level estimation are carried out in parallel with each other, and, after both pieces of information are prepared, inverse matrix calculation is started, and then, after an inverse matrix calculation value is prepared, decoding of a DATA portion is immediately started In addition, FIG. 16 shows an example of a latency taken for return and process symbols when the band is erroneously detected although the packet is exactly a GF packet (the symbol indicated in gray color in the drawing corresponds to a symbol to which the process goes back to handle). When it is found in step S33 that the packet is exactly a GF packet, at the time of return, the reception signal information of the HT-LTF received before the termination time of CRC check of the HT-SIG is read out from the buffer unit 907, and then inverse matrix calculation for calculation of a channel matrix and systemizing MMSE is executed. As shown in the drawing, the process goes back to the first HT-LTF. This is because it is handled as an L-LTF having different number of tones due to erroneous band detection.

For the GF packet of which the number of HT-LTFs is 1 (that is, the number of streams of MIMO is 1) and the DATA symbol is only one as shown at the lower row in FIG. 16, the time taken for the processes of going back to the first HT-LTF, decoding HT-SIG, equalizing a channel, and decoding the HT-DATA portion should fall within the allowable latency X microseconds taken for PHY receiving process. Thus, it becomes the strictest situation.

Thus, in order for GF packet receiving process to correctly return from erroneous band detection, the following three methods are conceivable.

(1) A method in which, for recalculation, calculation resources allocated exclusively to a GF packet are provided to perform high-speed calculation, and channel equalizing using HT-LTF, decoding of HT-SIG, and decoding of a single DATA symbol are performed so as to be able to start inverse matrix calculation at substantially the same timing as that when return is not attempted (2) A method in which a receiving system that is able to perform delayed OFDM symbol decoding within a latency of X microseconds is provided (3) A method in which, until a delay of process is recovered, the circuit described in the above (2) is used, and, when recovered, the process is switched to a normal processing circuit to prevent an increase in power consumption Note that, when it is erroneously determined to be a legacy packet in step S21, the SIGNAL information of the legacy packet (L-SIG) has no identification flag that indicates a usage band, so it is difficult to determine whether to return. Therefore, in the present embodiment, the erroneous determination of a legacy packet is nontarget for return process.

Next, a return method when error detection is found because the Q-BPSK determination result of the SIG portion, having an intermediate degree of reliability, does not coincide with the decoded SIG portion thereafter (No in step S24 or in step S32) will be described.

Figure 17:
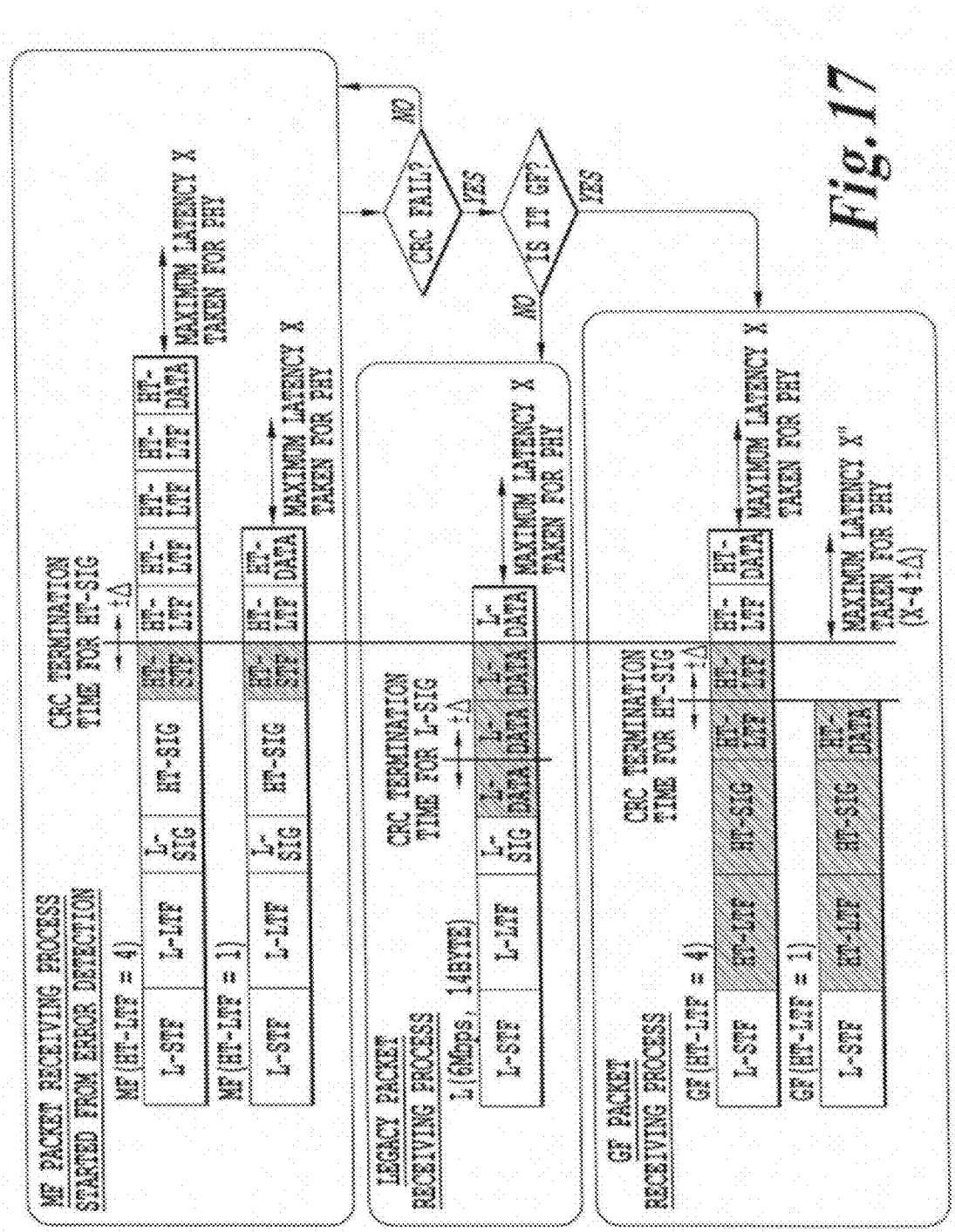
FIG. 17 is a view that shows an example of a latency taken for return and process symbols when the packet is erroneously determined to be an MF packet through Q-BPSK determination although the packet is exactly a legacy packet or a GF packet.

FIG. 17 is a view that shows an example of a latency taken for return and process symbols when it is erroneously determined to be an MF packet through Q-BPSK determination although the packet is exactly a legacy packet or a GF packet.

At the time of return, first, a detection process that determines which the packet is, a legacy packet or a GF packet, by referring to the determination result (GF detection) of the GF format in step S23 is executed.

When it is found that the received packet is exactly a legacy packet, as shown at the middle row in FIG. 17, the process goes back to third or fourth preceding DATA symbol to execute the various estimation calculations and decoding again, thus making it possible to return to receiving process of a legacy packet. Here, in order for the allowable latency, taken for receiving process of PHY, to fall within X microseconds, the following three methods are conceivable.

(1) A method in which, for recalculation, calculation resources allocated exclusively to a legacy packet are used to perform high-speed calculation, and a receiving system that is able to perform delayed OFDM symbol decoding so as to be able to start inverse matrix calculation at the same timing as that when return is not attempted (2) A method in which a receiving system that is able to perform delayed OFDM symbol decoding within a latency of X microseconds is provided (3) A method in which, until a delay of process is recovered, the circuit described in the above (2) is used, and, when recovered, the process is switched to a normal processing circuit to prevent an increase in power consumption On the other hand, when it is found that the received packet is exactly a GF packet, as shown at the lower row in FIG. 17, the process goes back to the first or second HT-LTF and the first DATA symbol to execute the various estimation calculations and decoding again, thus making it possible to return to receiving process of a GF packet. Here, in order for the allowable latency, taken for receiving process of PHY, to fall within X microseconds, the following three methods are conceivable.

Figure 18:
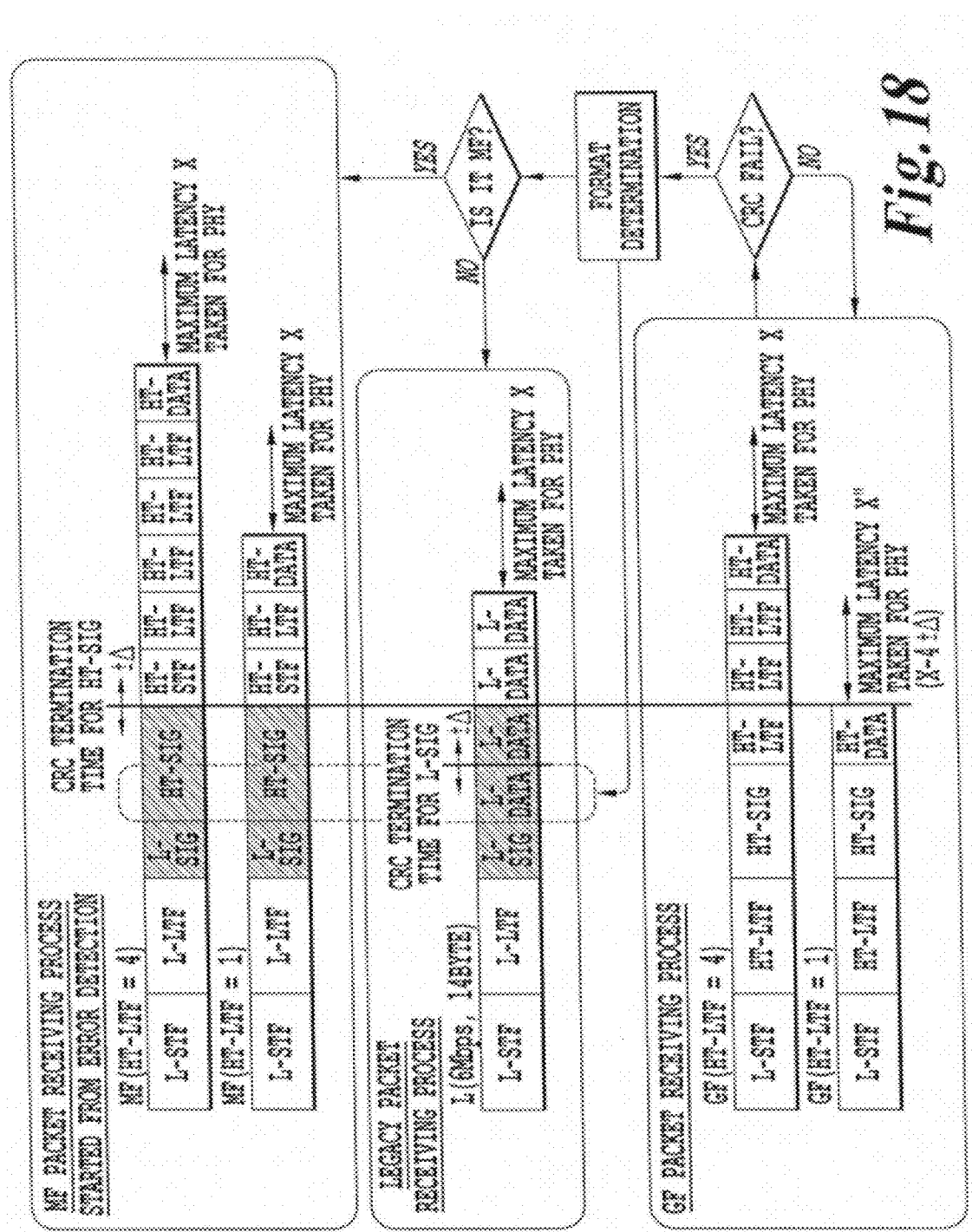
FIG. 18 is a view that shows a example of a latency taken for return and process symbols when the packet is erroneously determined to be a GF packet through Q-BPSK determination although the packet is exactly a legacy packet or an MF packet.

(1) A method in which, for recalculation, calculation resources allocated exclusively to an GF packet are provided in parallel with normal calculation resources to perform high-speed calculation, and a receiving system that is able to perform delayed OFDM symbol decoding so as to be able to start inverse matrix calculation at substantially the same timing as that when return is not attempted (2) A method in which a receiving system that is able to perform delayed OFDM symbol decoding within a latency of X microseconds is provided (3) A method in which, until a delay of process is recovered, the circuit described in the above (2) is used, and, when recovered, the process is switched to a normal processing circuit to prevent an increase in power consumption FIG. 18 is a view that shows an example of a latency taken for return and process symbols when it is erroneously determined to be a GF packet through Q-BPSK determination although the packet is exactly a legacy packet or an MF packet.

At the time of return, first, a detection process that determines whether it is an HT format or a legacy format in such a manner that three OFDM symbols at the L-SIG and its following symbols are read from the buffer 907 and Q-BPSK determination is carried out.

Here, when it is found that the received packet is exactly a legacy packet, as shown at the middle row in FIG. 18, the L-SIG and L-DATA of two OFDM symbols, read from the buffer 907, are decoded, thus making it possible to return to receiving process of a legacy packet. Here, in order to return from erroneous band detection within the allowable latency X microseconds taken for receiving process of PHY, the following three methods are conceivable.

(1) A method in which, for recalculation, calculation resources allocated exclusively to a legacy packet are used to perform high-speed calculation, and a receiving system that is able to perform delayed OFDM symbol decoding so as to be able to start inverse matrix calculation at the same timing as that when return is not attempted (2) A method in which a receiving system that is able to perform delayed OFDM symbol decoding within a latency of X microseconds is provided (3) A method in which, until a delay of process is recovered, the circuit described in the above (2) is used, and, when recovered, the process is switched to a normal processing circuit to prevent an increase in power consumption On the other hand, when it is found that the received packet is exactly an MF packet, as shown at the upper row in FIG. 18, the L-SIG and HT-SIG, read from the buffer 907, are decoded, thus making it possible to return to receiving process of a legacy packet. Here, in order to return from erroneous band detection within the allowable latency X microseconds taken for receiving process of PHY, the following three methods are conceivable.

(1) A method in which, for calculation, calculation resources allocated exclusively to an MF packet are used to perform high-speed calculation, and a receiving system that is able to decode L-SIG and HT-SIG of two OFDM symbols so as to be able to start inverse matrix calculation at the same timing as that when return is not attempted (2) A method in which a receiving system that is able to perform delayed OFDM symbol decoding within a latency of X microseconds is provided (3) A method in which, until a delay of process is recovered, the circuit described in the above (2) is used, and, when recovered, the process is switched to a normal processing circuit to prevent an increase in power consumption Note that, in Q-BPSK determination of the SIG portion executed in step S23, when the packet is erroneously determined as a legacy packet although the packet is exactly an HT packet, parity check in the L-SIG in the following step S26 fails. As a result, the process proceeds to step S26-1 to carry out error process; however, it is difficult to return from that step. Therefore, in the present embodiment, the error determination of a legacy packet is nontarget for return process.

Figure 19:
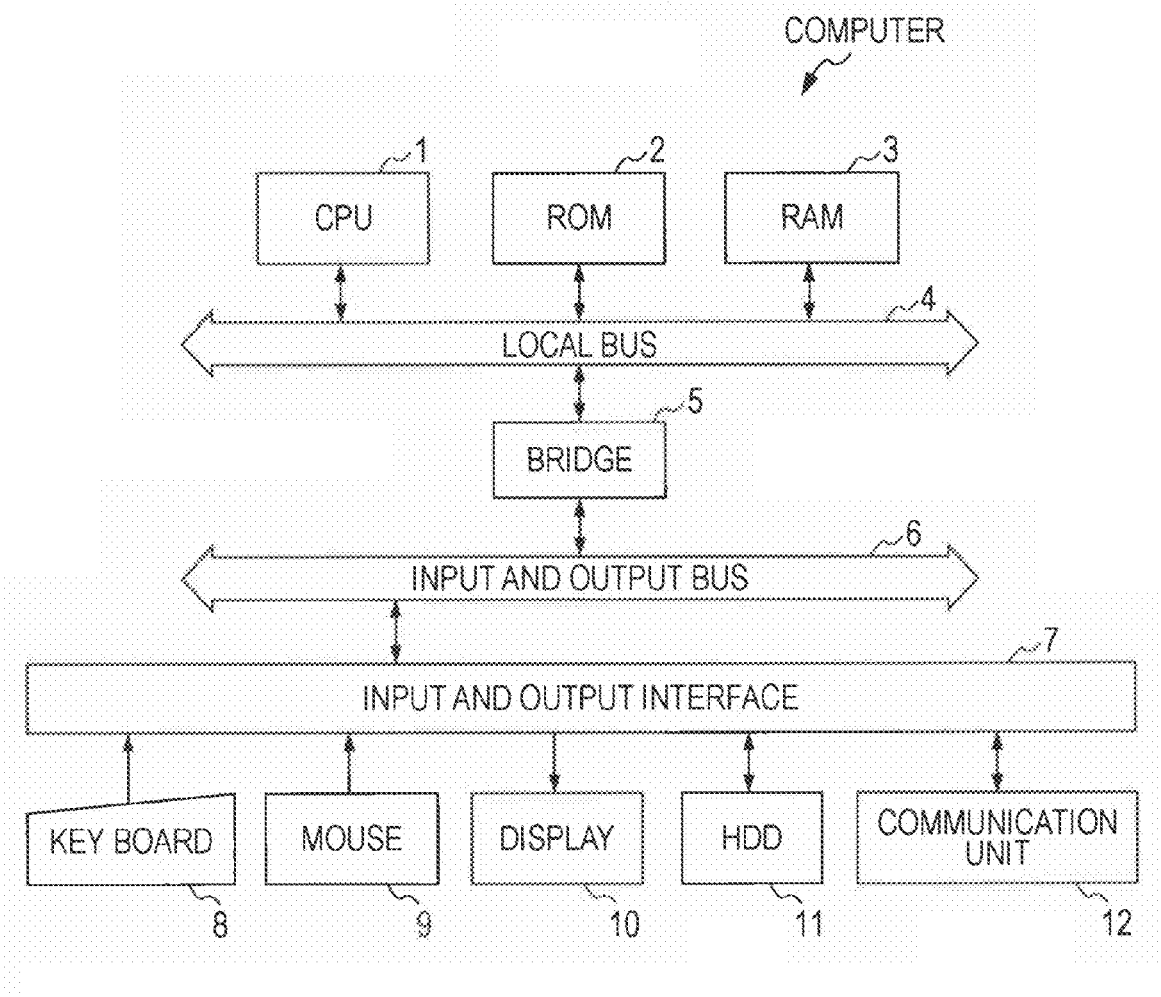
FIG. 19 is a view that shows the configuration example of a computer having installed a wireless communication function.

Heretofore, the configuration and operation of the wireless communication function shown in FIG. 1 is described. The wireless communication function is, for example, installed in an information processing device, such as a computer. FIG. 19 is a view that shows the configuration example of a computer having installed a wireless communication function.

A CPU (Central Processing Unit) 1 executes a program stored in a ROM (Read Only Memory) 2 or a hard disk drive (HDD) 11 under a program execution environment provided by an operating system (OS). For example, a process of synchronizing a received packet, which will be described later, or part of that process may be implemented in a form that the CPU 1 executes a predetermined program.

The ROM 2 permanently stores a program code, such as POST (Power On Self Test) and BIOS (Basic Input Output System). A RAM (Random Access Memory) 3 is used to load a program stored in the ROM 2 or the HDD 11 when the CPU 1 executes the program, or to temporarily hold work data of a program being executed. These are connected by a local bus 4 directly connected to a local pin of the CPU 1.

The local bus 4 is connected to an input/output bus 6, such as a PCI (Peripheral Component Interconnect) bus, via a bridge 5.

A keyboard 8 and a pointing device 9, such as a mouse, are input devices operated by a user. A display 10 is formed of an LCD (Liquid Crystal Display), a CRT (Cathode Ray Tube), or the like, and displays various pieces of information in text or image.

The HDD 11 is a drive unit that has installed a hard disk, which serves as a recording medium, and drives the hard disk. The hard disk is used to install a program, such as an operating system and various applications, executed by the CPU 1 and to save a data file, or the like.

A communication unit 12 is, for example, a wireless communication interface that conforms to IEEE802.11a/n. The communication unit 12 operates as an access point or a terminal station in an infrastructure mode or operates in an ad hoc mode, and executes communication with another communication terminal present within a communication area.

The present application contains subject matter related to that disclosed in Japanese Priority Patent Application JP 2008-276290 filed in the Japan Patent Office on Oct. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus that operates in a network environment in which a plurality of different packet formats are present, the apparatus comprising:
a first format detecting unit that detects a format by executing signal processing on a preamble of a received packet before decoding;
an estimating unit that uses the preamble of the received packet to calculate multiple types of estimations;
a decoding unit that decodes the received packet in accordance with the format detected by the first format detecting unit on the basis of the estimations calculated by the estimating unit;
a second format detecting unit that detects the format of the received packet on the basis of control (SIG) information in the preamble of the received packet decoded by the decoding unit;
an error detection determination unit that, when the format detected by the first format detecting unit differs from the format detected by the second format detecting unit, determines that the format detected by the first format detecting unit is an error; and
a control unit that controls operations of the estimating unit and the decoding unit on the basis of a result determined by the error detection determination unit.

2. The wireless communication apparatus according to claim 1, further comprising:
a checking unit that performs a parity check, frame check sequence (FCS), or cyclic redundancy check (CRC) on a signal that has been decoded by the decoding unit and that has been further error-corrected, wherein
the second format detecting unit detects the format of the received packet on the basis of the decoded signal that has been successfully checked by the checking unit.

3. The wireless communication apparatus according to claim 1, further comprising:
a buffer that accumulates necessary reception signal information to execute the multiple types of estimations by the estimating unit and decoding by the decoding unit, wherein
the control unit causes the estimating unit to execute the estimations and the decoding unit to execute the decoding in accordance with the format of the received packet detected by the first format detecting unit, and causes the estimating unit to execute the estimations or the decoding unit to execute the decoding by reading the necessary reception signal information from the buffer as the error detection determination unit determines that the format detected by the first format detecting unit is an error.

4. The wireless communication apparatus according to claim 1, further comprising:
a band detecting unit that detects a band of a packet before decoding the packet; and
a buffer that accumulates necessary reception signal information to execute the multiple types of estimations by the estimating unit and decoding by the decoding unit, wherein
the control unit compares the band detected by the band detecting unit with a band indicated by the decoded control (SIG) information in the preamble of the received packet, and, when the band detected by the band detecting unit does not coincide with the band indicated by the decoded control (SIG) information, the control unit causes the estimating unit to execute the estimations and the decoding unit to execute the decoding by reading the necessary reception signal information from the buffer.

5. A wireless communication apparatus that operates in a network environment in which a plurality of different packet formats are present, the apparatus comprising:
a signal processing unit that executes signal processing in accordance with all packet formats;
a format determination unit that determines a format of a received packet on the basis of decoded control (SIG) information in a preamble of the received packet and by executing signal processing on the preamble of the received packet before decoding the received packet; and
a decoding unit that decodes only a reception signal processed by the signal processing unit upon determination that the format of the received packet determined on the basis of the decoded control (SIG) information in the preamble of the received packet corresponds to the format of the received packet determined by executing signal processing on the preamble of the received packet before decoding the received packet.

6. A wireless communication apparatus that operates in a network environment in which a plurality of different packet formats are present, the wireless communication apparatus comprising:
a buffer that accumulates reception signal information before executing various signal processings;
a decoding unit that decodes a reception signal;
a format determination unit that determines the format of a received packet on the basis of decoded control (SIG) information in a preamble of the received packet, the decoding resumed by reading the reception signal information from the buffer after the format has been determined by the format determination unit; and
a band detecting unit that detects the band of a packet before decoding, wherein
the band detected by the band detecting unit is compared with a band indicated by the decoded control (SIG) information in the preamble of the received packet, and, when the band detected by the band detecting unit does not coincide with the band indicated by the decoded control (SIG) information, the necessary reception signal information is read out from the buffer to go back to execute estimations by an estimating unit and the decoding by the decoding unit.

7. The wireless communication apparatus according to claim 6, further comprising:
a checking unit that performs a parity check, frame check sequence (FCS), or cyclic redundancy check (CRC) on a signal that has been decoded by the decoding unit and that has been further error-corrected, wherein
the buffer accumulates the reception signal information up to around a time at which a check result is determined by the checking unit, and
the format determination unit determines the format of the received packet on the basis of the decoded control information that has been successfully checked by the checking unit.

8. A wireless communication method in a network environment in which a plurality of different packet formats are present, the method comprising the steps of:
detecting a format of a received packet through signal processing on a preamble of the received packet before decoding;
executing multiple types of estimations using the preamble of the received packet;
accumulating necessary reception signal information in order to execute the multiple types of estimations and decoding;
decoding the received packet in accordance with the detected format on the basis of the multiple types of estimations;
detecting the format of the received packet on the basis of a decoded control (SIG) information in the preamble of the received packet; and
when the format detected through signal processing before the decoding differs from the format detected on the basis of the decoded control (SIG) information in the preamble of the received packet, determining that the format detected through signal processing before the decoding is an error, and executing the multiple types of estimations or the decoding using the accumulated necessary reception signal information as the format detected through signal processing before the decoding is an error.

9. A wireless communication method in a network environment in which a plurality of different packet formats are present, the method comprising the steps of:
executing signal processing in accordance with all packet formats;
determining a format of a received packet on the basis of decoded control (SIG) information in a preamble of the received packet and by executing signal processing on the preamble of the received packet before decoding the received packet; and
decoding only a reception signal subjected to the signal processing upon determination that the format of the received packet determined on the basis of the decoded control (SIG) information in the preamble of the received packet corresponds to the format of the received packet determined by executing signal processing on the preamble of the received packet before decoding the received packet.

10. A wireless communication method in a network environment in which a plurality of different packet formats are present, the method comprising the steps of:
- accumulating reception signal information before various signal processings;
- decoding a reception signal; and
- determining a format of a received packet on the basis of decoded control (SIG) information in a preamble of the received packet and by executing signal processing on the preamble of the received packet before decoding the reception signal, wherein
- decoding is performed on the reception signal by reading the reception signal information upon determination that the format of the received packet determined on the basis of the decoded control (SIG) information in the preamble of the received packet corresponds to the format of the received packet determined by executing signal processing on the preamble of the received packet before decoding the reception signal.

11. A non-transitory computer readable storage medium having instructions stored therein which when executed by a processor in a network environment in which a plurality of different packet formats are present, causes the processor to instruct:
- a first format detecting unit to detect a format by executing signal processing on a preamble of a received packet before decoding;
- an estimating unit to use the preamble of the received packet to calculate multiple types of estimations;
- a decoding unit to decode the received packet in accordance with the format detected by the first format detecting unit on the basis of the estimations by the estimating unit;
- a buffer to accumulate necessary reception signal information in order to go back to execute the multiple types of estimations by the estimating unit and the decoding by the decoding unit;
- a second format detecting unit to detect the format of the received packet on the basis of control (SIG) information in the preamble of the received packet decoded by the decoding unit;
- an error detection determination unit to, when the format detected by the first format detecting unit differs from the format detected by the second format detecting unit, determine that the format detected by the first format detecting unit is an error; and
- a control unit to cause the estimating unit to execute the estimations and the decoding unit to execute the decoding in accordance with the format of the received packet detected by the first format detecting unit, and to execute the estimations by the estimating unit or the decoding by the decoding unit by reading the necessary reception signal information from the buffer as the error detection determination unit determines that the format detected by the first format detecting unit is an error.

12. A non-transitory computer readable storage medium having instructions stored therein, which when executed by a processor in a network environment in which a plurality of different packet formats are present, causes the processor to instruct:
- a signal processing unit to execute signal processing in accordance with all packet formats;
- a format determination unit to determine a format of a received packet on the basis of decoded control (SIG) information in a preamble of the received packet and by executing signal processing on the preamble of the received packet before decoding the received packet; and
- a decoding unit to decode only a reception signal subjected to signal processing by the signal processing unit upon determination that the format of the received packet determined on the basis of the decoded control (SIG) information in the preamble of the received packet corresponds to the format of the received packet determined by executing signal processing on the preamble of the received packet before decoding the received packet.

13. A non-transitory computer readable storage medium having instructions stored therein, which when executed by a processor in a network environment in which a plurality of different packet formats are present, causes the processor to instruct:
- a signal processing unit to execute signal processing in accordance with all packet formats;
- a format determination unit to determine a format of a received packet on the basis of decoded control (SIG) information in a preamble of the received packet and by executing signal processing on the preamble of the received packet before decoding the received packet; and
- a decoding unit to decode only a reception signal subjected to signal processing by the signal processing unit upon determination that the format of the received packet determined on the basis of the decoded control (SIG) information in the preamble of the received packet corresponds to the format of the received packet determined by executing signal processing on the preamble of the received packet before decoding the received packet, wherein
- decoding is performed by reading the reception signal information from a buffer after the format has been determined by the format determination unit.

14. The wireless communication apparatus according to claim 5, further comprising:
- a buffer that accumulates reception signal information before executing various signal processings.

15. The wireless communication apparatus according to claim 5, further comprising:
- a band detecting unit that detects the band of the received packet before decoding, where in the band detected by the band detecting unit is compared with a band indicated by the decoded control (SIG) information in the preamble of the received packet.

* * * * *